(12) United States Patent
Kenmoku et al.

(10) Patent No.: US 7,589,156 B2
(45) Date of Patent: Sep. 15, 2009

(54) POLYHYDROXYALKANOIC ACID HAVING ESTER, CARBOXYL OR SULFONIC ACID GROUP, AND PRODUCING METHOD THEREFOR

(75) Inventors: Takashi Kenmoku, Fujisawa (JP); Chieko Mihara, Isehara (JP); Tatsuki Fukui, Yokohama (JP); Ako Kusakari, Tokyo (JP); Tetsuya Yano, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 330 days.

(21) Appl. No.: 10/580,830

(22) PCT Filed: Jun. 9, 2005

(86) PCT No.: PCT/JP2005/011000

§ 371 (c)(1),
(2), (4) Date: May 26, 2006

(87) PCT Pub. No.: WO2005/121208

PCT Pub. Date: Dec. 22, 2005

(65) Prior Publication Data

US 2007/0117937 A1    May 24, 2007

(30) Foreign Application Priority Data

Jun. 11, 2004  (JP)  .............................. 2004-174788
Jun. 8, 2005   (JP)  .............................. 2005-168914

(51) Int. Cl.
*C08G 65/334* (2006.01)
*C08G 63/91* (2006.01)

(52) U.S. Cl. ...................................... 525/411; 525/412
(58) Field of Classification Search ................... 525/411
See application file for complete search history.

(56) References Cited

U.S. PATENT DOCUMENTS

| | | | | |
|---|---|---|---|---|
| 4,265,247 | A | 5/1981 | Lenz et al. | 606/230 |
| 4,320,753 | A | 3/1982 | Lenz et al. | 424/444 |
| 4,975,482 | A * | 12/1990 | Peiffer | 524/535 |
| 5,610,241 | A | 3/1997 | Lee et al. | 525/411 |
| 6,083,729 | A | 7/2000 | Martin et al. | |
| 6,156,429 | A | 12/2000 | Marcincinova et al. | 428/402 |
| 6,645,743 | B1 | 11/2003 | Honma et al. | 435/146 |
| 7,393,912 | B2 * | 7/2008 | Mihara et al. | 528/272 |
| 2005/0196521 | A1 | 9/2005 | Kozaki et al. | 427/2.24 |
| 2006/0014921 | A1 * | 1/2006 | Mihara et al. | 528/272 |
| 2006/0211100 | A1 | 9/2006 | Kenmoku et al. | 435/135 |
| 2006/0247414 | A1 | 11/2006 | Kenmoku et al. | 528/272 |
| 2007/0155912 | A1 | 7/2007 | Kenmoku et al. | |

FOREIGN PATENT DOCUMENTS

| | | |
|---|---|---|
| FR | 2 765 228 | 12/1998 |
| JP | 2-3415 | 1/1990 |
| WO | 2004/061530 A1 | 7/2004 |
| WO | WO/2004/061530 * | 7/2004 |
| WO | WO 2005/121204 A2 | 12/2005 |
| WO | WO 2005/121207 A2 | 12/2005 |

OTHER PUBLICATIONS

Moore, John W.; Stanitsky, Conrad L.; Jurs, Peter C. Chemistry: The Molecular Science. pp. 682-683. Brooks/Cole: Toronto 2002.*
EIC-STIC search transcript.*
Mikael Trollsås et al., "Hydrophilic Aliphatic Polyesters: Design, Synthesis, and Ring-Opening Polymerization of Functional Cyclic Esters," 33 *Macromol.* 4619-27 (2000).
Bryan Parrish et al., "Functional Polyesters by Ring-Opening Polymerization of α-allyl(σ-valerolactone)," 87 *Polymer. Mater.: Sci. & Eng.* 254-55 (2002).
C.P. Radano et al., "Synthesis of Novel Biodegradable Copolyesters Using Olefin Metathesis," 43(2) *Polymer Reprints* 727-28 (2002).
Hironobu Fukuzaki et al., "Synthesis of Biodegradable Copoly(L-Lactic Acid/Aromatic Hydroxyacids) with Relatively Low Molecular Weight," 26(12) *Eur. Polym. J.* 1273-77 (1990).
James K. Whitesell et al., "Homochiral and Heterochiral Polyesters: Polymers Derived from Mandelic Acid," 2(3) *Chem. Mater.* 248-54 (1990).
Benjamin Saulnier et al., "Lactic Acid-Based Functionalized Polymers via Copolymerization and Chemical Modification," 4 *Macromol. Biosci.* 232-37 (2004).
Sandrine Cammas et al., "Polymers of Maleic Acid and 3-Alkylmaleic Acid as Synthetic PHAs in the Design of Biocompatible Hydrolyzable Devices," 25 *Intl. J. Biol. Macromol.* 273-82 (1999).
S. Ponsart et al., "A Novel Route to Poly(ε-caprolactone)-Based Copolymers via Anionic Derivatization," 1 *Biomolecules* 275-81 (2000).
Mao Yin et al., "Preparation and Characterization of Substituted Polylactides," 32(23) *Macromol.* (1999).
Tetsuji Yamaoka et al., "Synthesis and Properties of Malic Acid-Containing Functional Polymers," 25 *Intl. J. Biol. Macromol.* 265-71 (1999).

* cited by examiner

*Primary Examiner*—Randy Gulakowski
*Assistant Examiner*—Michael Dollinger
(74) *Attorney, Agent, or Firm*—Fitzpatrick, Cella, Harper & Scinto

(57) ABSTRACT

The invention is to provide a novel polyhydroxyalkanoate having a reactive functional group within a molecule, a novel polyhydroxyalkanoate having a novel function by a chemical modification of the polyhydroxyalkanoate having the reactive functional group, and a producing method therefor. A polyhydroxyalkanoate containing a unit having a carboxyl group in a side chain is utilized for deriving a polyhydroxyalkanoate containing a unit having an amide group and a sulfonic acid group in the molecule.

4 Claims, No Drawings

POLYHYDROXYALKANOIC ACID HAVING ESTER, CARBOXYL OR SULFONIC ACID GROUP, AND PRODUCING METHOD THEREFOR

TECHNICAL FIELD

The present invention relates to a novel polyhydroxyalkanoate and a producing method therefore.

BACKGROUND TECHNOLOGY

Biodegradable polymer materials are widely employed in medical materials, drug delivery systems, environment-matching materials and the like. New additional functions have recently become required and various researches are being conducted. Particularly in a polyhydroxyalkanoate represented by polylactic acid, an introduction of a chemically modifiable functional group into the molecule is investigated, and compounds having a carboxyl group or a vinyl group are reported. For example, polymalic acid is known as a polyhydroxyalkanoate having a carboxyl group in a side chain. A polymer of polymalic acid is known, by a manner of polymerization, in an α-type represented by a chemical formula (16):

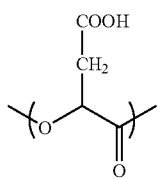

and a β-type represented by a chemical formula (17):

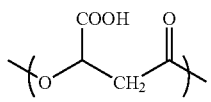

Among these, as polymalic acid of β-type and a copolymer thereof, U.S. Pat. No. 4,265,247 (patent literature 1) discloses a polymer formed by a ring-opening polymerization of a benzyl ester of β-malolactone represented by a chemical formula (18):

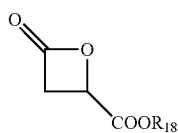

($R_{18}$: benzyl group)

Also as a copolymer of α-type polymalic acid and glycolic acid and a copolymer containing other hydroxyalkanoic acids other than glycolic acid, Japanese Patent Application Laid-open No. 2-3415 (patent literature 2) discloses a copolymer formed by a 6-membered ring diester monomer represented by a chemical formula (19):

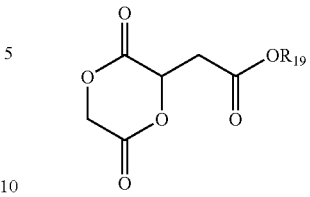

($R_{19}$ being a lower alkyl group such as a methyl group, an ethyl group, an n-propyl group, an isopropyl group or a t-butyl group, or a benzyl group) and a glycolide or a lactide which is a cyclic diester, or a lactone which is an intramolecular ring-closing ester of ω-hydroxycarboxylic acid.

Also as a polyhydroxyalkanoate having a carboxyl group in a side chain, Macromolecules 2000, 33(13), 4619-4627 discloses a ring-opening polymerization of 7-oxo-4-oxepanonecarboxylic acid ester to form a polymer having an ester group in a side chain and a hydrogenolysis of the polymer to obtain a polymer having a carboxylic acid in the side chain. Biomacromolecules 2000, 1, 275 discloses reacting poly(ε-caprolactone) with lithium diisopropylamide and then with benzyl chloroformate to obtain a polymer in which a benzyloxycarbonyl group is introduced into an α-methylene group in a carbonyl group present in the main chain of poly (ε-caprolactone). Macromolecular Bioscience 2004, 4, 232 discloses reacting polylactic acid with lithium diisopropylamide and then with benzyl bromoacetate to obtain a polymer in which a (benzyloxycarbonyl)methyl group is introduced into an α-methylene group in the carbonyl group present in the main chain of polylactic acid. As a polyhydroxyalkanoate having a vinyl group in a side chain, Polymeric Materials Science & Engineering 2002, 87, 254 discloses a polymer obtained by a ring-opening polymerization of α-allyl(δ-valerolactone). Also as a polyhydroxyalkanoate similarly having a vinyl group in a side chain, Polymer Preprints 2002, 43(2), 727 discloses a polymer formed by a ring-opening polymerization of 3,6-diallyl-1,4-dioxane-2,5-dione which is a 6-membered ring diester monomer.

Also there is reported a polymer having novel functions by introducing a structure providing a functionality into a polyhydroxyalkanoate in which a chemically modifiable functional group is introduced as described above. International Journal of Biological Macromolecules 25 (1999) 265 (non-patent literature 6) discloses a ring-opening polymerization of a cyclic dimer of α-malic acid and glycolic acid to obtain an α-malic acid-glycolic acid copolymer, and to unprotect the obtained polymer to obtain a polyester having a carboxyl group in a side chain. The carboxyl group of the side chain is chemically modified with a tripeptide to obtain a polymer, which is reported to provide a satisfactory result in an evaluation of a cell adhesiveness.

DISCLOSURE OF THE INVENTION

Though it is conceived possible to obtain a new functionality by introducing a unit having a carboxyl group or a unit having a vinyl group as a reactive functional group into the molecule and by chemically modifying such reactive functional group, but such reports are limited. Therefore, the present invention provides a novel polyhydroxyalkanoate having a reactive functional group in the molecule and a producing method therefor, and also to provide a novel polyhydroxyalkanoate having a novel function by chemically modifying polyhydroxyalkanoate having such reactive functional group and a producing method therefor.

The present inventors, as a result of intensive investigations for a novel polyhydroxyalkanoate having a reactive functional group in the molecule and for a novel polyhydroxyalkanoate having a novel function by chemically modifying the polyhydroxyalkanoate having such reactive functional group, have made the present invention.

According to an aspect of the present invention, there is provided polyhydroxyalkanoate comprised of at least a unit represented by a chemical formula (1) within the molecule:

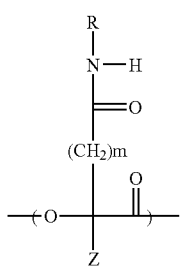

(1)

wherein R represents $-A_1-SO_2R_1$; $R_1$ represents OH, a halogen atom, ONa, OK or $OR_{1a}$; $R_{1a}$ and $A_1$ each independently represents a group having a substituted or unsubstituted aliphatic hydrocarbon structure, a substituted or unsubstituted aromatic ring structure or a substituted or unsubstituted heterocyclic structure; m represents an integer selected from 0-8 (The description "0-8" means - - - 0 to 8 - - -, and such a hyphen serves as an arbitrary equivalent of the phrase "up to and including" when used between numbers in this specification and claims); Z represents a linear or branched alkyl group, an aryl group or an aralkyl group substituted with an aryl group; and in case plural units are present, R, $R_1$, $R_{1a}$, $A_1$, m and Z have the aforementioned meanings independently for each unit.

The polyhydroxyalkanoate is preferably comprised of, as the unit represented by the chemical formula (1), at least a unit represented by a chemical formula (2), a chemical formula (3), a chemical formula (4A) or (4B), within a molecule:

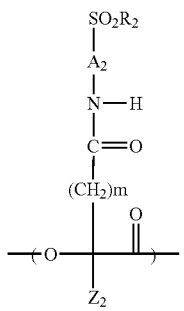

(2)

wherein $R_2$ represents OH, a halogen atom, ONa, OK or $OR_{2a}$; $R_{2a}$ represents a linear or branched alkyl group with 1 to 8 carbon atoms or a substituted or unsubstituted phenyl group; $A_2$ represents a linear or branched alkylene group with 1 to 8 carbon atoms; m represents an integer selected from 0-8; $Z_2$ represents a linear or branched alkyl group, an aryl group or an aralkyl group substituted with an aryl group; and in case plural units are present, $A_2$, $R_2$, $R_{2a}$, m and $Z_2$ have the aforementioned meanings independently for each unit;

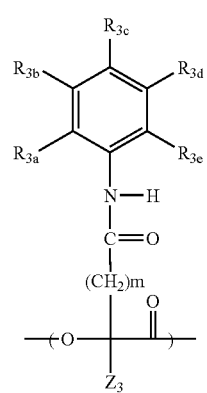

(3)

wherein $R_{3a}$, $R_{3b}$, $R_{3c}$, $R_{3d}$ and $R_{3e}$ each independently represents $SO_2R_{3f}$ ($R_{3f}$ representing OH, a halogen atom, ONa, OK or $OR_{3f1}$ ($R_{3f1}$ representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{3g}$ ($R_{3g}$ representing a H atom, a Na atom or a K atom), an acetamide group, an OPh group, a NHPh group, a $CF_3$ group, a $C_2F_5$ group or a $C_3F_7$ group (Ph indicating a phenyl group), of which at least one is $SO_2R_{3f}$; m represents an integer selected from 0-8; $Z_3$ represents a linear or branched alkyl group, an aryl group or an aralkyl group substituted with an aryl group; and in case plural units are present, $R_{3a}$, $R_{3b}$, $R_{3c}$, $R_{3d}$, $R_{3e}$, $R_{3f}$, $R_{3f1}$, $R_{3g}$, m and $Z_3$ have the aforementioned meanings independently for each unit;

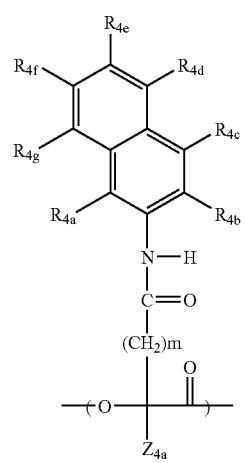

(4A)

wherein $R_{4a}$, $R_{4b}$, $R_{4c}$, $R_{4d}$, $R_{4e}$, $R_{4f}$ and $R_{4g}$ each independently represents $SO_2R_{4o}$ ($R_{4o}$ representing OH, a halogen atom, ONa, OK or $OR_{4o1}$ ($R_{4o1}$ representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$ ($R_{4p}$ representing a H atom, a Na atom or a K atom), an acetamide group, an OPh group, an NHPh group, a $CF_3$ group, a $C_2F_5$ group or a $C_3F_7$ group (Ph indicating a phenyl group), of which at least one is $SO_2R_{4o}$; m represents an integer selected from 0-8; $Z_{4a}$ represents a linear or branched alkyl group, an aryl group or an aralkyl group substituted with an aryl group; and in case plural units are present, $R_{4a}$, $R_{4b}$, $R_{4c}$, $R_{4d}$, $R_{4e}$, $R_{4f}$, $R_{4g}$, $R_{4o}$, $R_{4o1}$, $R_{4p}$, m and $Z_{4a}$ have the aforementioned meanings independently for each unit;

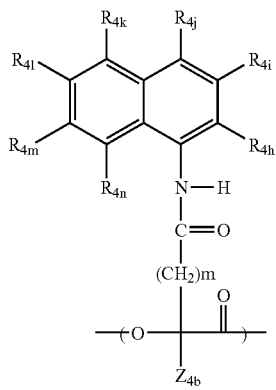

(4B)

wherein $R_{4h}$, $R_{4i}$, $R_{4j}$, $R_{4k}$, $R_{4l}$, $R_{4n}$ and $R_{4m}$, each independently represents $SO_2R_{4o}$ ($R_{4o}$ representing OH, a halogen atom, ONa, OK or $OR_{4o1}$ ($R_{4o1}$ representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$ ($R_{4p}$ representing a H atom, a Na atom or a K atom), an acetamide group, an OPh group, an NHPh group, a $CF_3$ group, a $C_2F_5$ group or a $C_3F_7$ group (Ph indicating a phenyl group), of which at least one is $SO_2R_{4o}$; m represents an integer selected from 0-8; $Z_{4b}$ represents a linear or branched alkyl group, an aryl group or an aralkyl group substituted with an aryl group; and in case plural units are present, $R_{4h}$, $R_{4i}$, $R_{4j}$, $R_{4k}$, $R_{4l}$, $R_{4m}$, $R_{4n}$, $R_{4o}$, $R_{4o1}$, $R_{4p}$, m and $Z_{4b}$ have the aforementioned meanings independently for each unit.

According to another aspect of the present invention, there is provided polyhydroxyalkanoate comprised of at least a unit represented by a chemical formula (5) within a molecule:

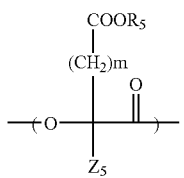

(5)

wherein $R_5$ represents hydrogen, a group capable of forming a salt or $R_{5a}$; $R_{5a}$ represents a linear or branched alkyl group with 1-12 carbon atoms, an aralkyl group or a substituent having a sugar; m represents an integer selected from 0-8; $Z_5$ represents a linear or branched alkyl group, an aryl group or an aralkyl group substituted with an aryl group; however $R_5$ only represents a substituent having a sugar in case $Z_5$ is a methyl group and m is 0-1; and in case plural units are present, $R_5$, $R_{5a}$, m and $Z_5$ have the aforementioned meanings independently for each unit.

The above polyhydroxyalkanoate is preferably further comprised of a unit represented by a chemical formula (6) within a molecule:

(6)

wherein $R_6$ represents a linear or branched alkylene with 1-11 carbon atoms, alkyleneoxyalkylene group (each alkylene group being independently with 1-2 carbon atoms), a linear or branched alkenyl group with 1-11 carbon atoms or an alkylidene group with 1-5 carbon atoms which may be substituted with an aryl group; and in case plural units are present, $R_6$ has the aforementioned meanings independently for each unit.

According to a still another aspect of the present invention, there is provided a method for producing a polyhydroxyalkanoate comprising a unit represented by a chemical formula (8), comprised of a step of executing hydrolysis of a polyhydroxyalkanoate comprising a unit represented by a chemical formula (7) in the presence of an acid or an alkali, or a step of executing hydrogenolysis comprising a catalytic reduction of a polyhydroxyalkanoate comprising a unit represented by a chemical formula (7)

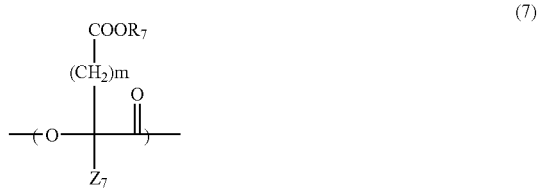

(7)

wherein $R_7$ represents a linear or branched alkyl group with 1-12 carbon atoms or an aralkyl group; m represents an integer selected from 0-8; $Z_7$ represents a linear or branched alkyl group, an aryl group or an aralkyl group substituted with an aryl group, and m represents an integer selected from 2-8 in case $Z_7$ is a methyl group; and in case plural units are present, $R_7$, m and $Z_7$ have the aforementioned meanings independently for each unit;

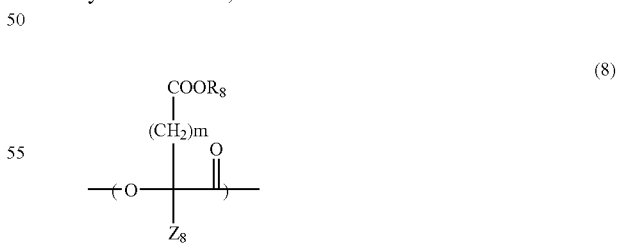

(8)

wherein $R_8$ represents hydrogen, or a group capable of forming a salt; m represents an integer selected from 0-8; $Z_8$ represents a linear or branched alkyl group, an aryl group or an aralkyl group substituted with an aryl group, and m represents an integer selected from 2-8 in case $Z_8$ is a methyl group; and, in case plural units are present, $R_8$, m and $Z_8$ have the aforementioned meanings independently for each unit.

According to a further aspect of the present invention, there is provided a method for producing a polyhydroxyalkanoate comprising a unit represented by a chemical formula (1), comprised of a step of executing a condensation reaction of a polyhydroxyalkanoate comprising a unit represented by a chemical formula (9) and an amine compound represented by a chemical formula (10):

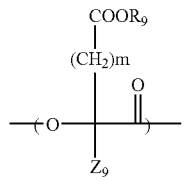
(9)

wherein $R_9$ represents hydrogen, or a group capable of forming a salt; m represents an integer selected from 0-8; $Z_9$ represents a linear or branched alkyl group, an aryl group or an aralkyl group substituted with an aryl group; and, in case plural units are present, m, $R_9$ and $Z_9$ have the aforementioned meanings independently for each unit;

$$H_2N\text{—}A_3\text{—}SO_2R_{10} \quad (10)$$

wherein $R_{10}$ represents OH, a halogen atom, ONa, OK or $OR_{10a}$; $R_{10a}$ and $A_3$ each independently is selected from a group having a substituted or unsubstituted aliphatic hydrocarbon structure, a substituted or unsubstituted aromatic ring structure, or a substituted or unsubstituted heterocyclic structure; and, in case plural units are present, $R_{10}$, $R_{10a}$ and $A_3$ have the aforementioned meanings independently for each unit;

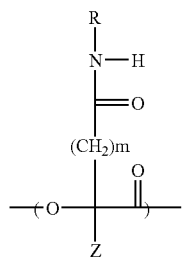
(1)

wherein R represents —$A_1$—$SO_2R_1$; $R_1$ represents OH, a halogen atom, ONa, OK or $OR_{1a}$; $R_{1a}$ and $A_1$ each independently represents a group having a substituted or unsubstituted aliphatic hydrocarbon structure, a substituted or unsubstituted aromatic ring structure or a substituted or unsubstituted heterocyclic structure; m represents an integer selected from 0-8; Z represents a linear or branched alkyl group, an aryl group or an aralkyl group substituted with an aryl group; and in case plural units are present, R, $R_1$, $R_{1a}$, $A_1$, m and Z have the aforementioned meanings independently for each unit.

According to a further aspect of the present invention, there is provided a method for producing a polyhydroxyalkanoate comprising a unit represented by a chemical formula (13), comprised of:

a step of reacting a polyhydroxyalkanoate comprising a unit represented by a chemical formula (11) with a base; and a step of reacting a compound obtained in the aforementioned step with a compound represented by a chemical formula (12):

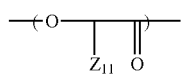
(11)

wherein $Z_{11}$ represents a linear or branched alkyl group, an aryl group or an aralkyl group substituted with an aryl group; and in case plural units are present, $Z_{11}$ has the aforementioned meanings independently for each unit;

$$X(CH_2)mCOOR_{12} \quad (12)$$

wherein m represents an integer selected from 0-8; X represents a halogen atom; and $R_{12}$ represents a linear or branched alkyl group with 1-12 carbon atoms or an aralkyl group;

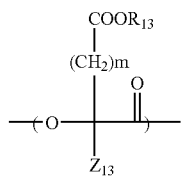
(13)

wherein m represents an integer selected from 0-8; $R_{13}$ represents a linear or branched alkyl group with 1-12 carbon atoms or an aralkyl group; $Z_{13}$ represents a linear or branched alkyl group, an aryl group or an aralkyl group substituted with an aryl group, and m represents an integer selected from 2-8 in case $Z_{13}$ is a methyl group; and in case plural units are present, $R_{13}$, m and $Z_{13}$ have the aforementioned meanings independently for each unit.

According to a further aspect of the present invention, there is provided a method for producing a polyhydroxyalkanoate comprising a unit represented by a chemical formula (15), comprised of:

a step of reacting a polyhydroxyalkanoate comprising a unit represented by a chemical formula (11) with a base; and a step of reacting a compound obtained in the aforementioned step with a compound represented by a chemical formula (14):

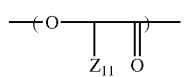
(11)

wherein $Z_{11}$ represents a linear or branched alkyl group, an aryl group or an aralkyl group substituted with an aryl group; and in case plural units are present, $Z_{11}$ has the aforementioned meanings independently for each unit;

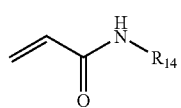
(14)

wherein $R_{14}$ represents —$A_{14}$—$SO_2R_{14a}$; $R_{14a}$ represents OH, a halogen atom, ONa, OK or $OR_{14b}$; $R_{14b}$ and $A_{14}$ each independently is selected from a group having a substituted or unsubstituted aliphatic hydrocarbon structure, a substituted or unsubstituted aromatic ring structure or a substituted or unsubstituted heterocyclic structure; and in case plural units are present, $R_{14}$, $R_{14a}$, $R_{14b}$, and $A_{14}$ have the aforementioned meanings independently for each unit;

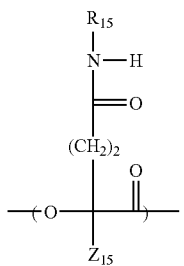

(15)

wherein $R_{15}$ represents —$A_{15}$—$SO_2R_{15a}$; $R_{15a}$ represents OH, a halogen atom, ONa, OK or $OR_{15b}$; $R_{15b}$ and $A_{15}$ each independently represents a group having a substituted or unsubstituted aliphatic hydrocarbon structure, a substituted or unsubstituted aromatic ring structure or a substituted or unsubstituted heterocyclic structure; $Z_{15}$ represents a linear or branched alkyl group, an aryl group or an aralkyl group substituted with an aryl group; and in case plural units are present, $R_{15}$, $R_{15a}$, $R_{15b}$, and $A_{15}$ have the aforementioned meanings independently for each unit.

BEST MODE FOR CARRYING OUT THE INVENTION

The present invention will be clarified in the following. A polyhydroxyalkanoate represented by a chemical formula (1) and constituting the object of the invention can be produced by a reaction of a polyhydroxyalkanoate represented by a chemical formula (9) to be employed as a starting material, and at least an aminosulfonic acid represented by a chemical formula (10).

More specifically, in the compound represented by the chemical formula (9) to be employed in the invention, $Z_9$ represents a linear or branched alkyl group, an aryl group or an aralkyl group substituted with an aryl group. Specifically, the linear or branched alkyl group can be a methyl group, an ethyl group, a propyl group, an isopropyl group (2-methylpropyl group), a butyl group, a 1-methylpropyol group, a pentyl group, an isopropyl group (3-methylbutyl group), a hexyl group, an isohexyl group (4-methylpentyl group), or a heptyl group. Also an aryl group can be a phenyl group or a methylphenyl group. Also an aralkyl group can be a phenylmethyl group (benzyl group), a phenylethyl group, a phenylpropyl group, a phenylbutyl group, a phenylpentyl group or a methylbenzyl group. In the invention, in consideration of productivity, $Z_{11}$ is preferably a methyl group, an ethyl group, a propyl group, an isopropyl group, a pentyl group, a hexyl group, a phenyl group or a phenylmethyl group.

On the other hand, in the compound represented by the chemical formula (10) of the invention:

In chemical formula (10), $R_{10a}$ is preferably a linear or branched alkyl group with 1-8 carbon atoms, or a substituted or unsubstituted phenyl group. $A_3$ is preferably a linear or branched, substituted or unsubstituted alkylene group with 1-8 carbon atoms, a substituted or unsubstituted phenylene group, a substituted or unsubstituted naphthalene group, or a substituted or unsubstituted group having a heterocyclic structure comprising at least one of N, S and O. In case $A_3$ has a cyclic structure, an unsubstituted ring may be further condensed. In case plural units are present, $R_{10}$, $R_{10a}$ and $A_3$ have the aforementioned meanings independently for each unit.

In case $A_3$ is a substituted or unsubstituted alkylene group, there can be employed an aminosulfonic acid represented by a chemical formula (20):

$$H_2N—A_4—SO_2R_{20} \quad (20)$$

wherein $R_{20}$ represents OH, a halogen atom, ONa, OK or $OR_{20a}$; $R_{20a}$ represents a linear or branched alkyl group with 1-8 carbon atoms, or a substituted or unsubstituted phenyl group; $A_4$ represents a linear or branched, substituted or unsubstituted alkylene group with 1-8 carbon atoms, and in case substituted, it may be substituted with an alkyl group with 1-20 carbon atoms or an alkoxy group with 1-20 carbon atoms.

The compound represented by the chemical formula (20) can be 2-aminoethanesulfonic acid (taurin), 3-aminopropanesulfonic acid, 4-aminobutanesulfonic acid, 2-amino-2-methylpropane-sulfonic acid, or an alkali metal salt or an ester thereof.

In case $A_3$ is a substituted or unsubstituted phenylene group, there can be employed an aminosulfonic acid compound represented ba chemical formula (21):

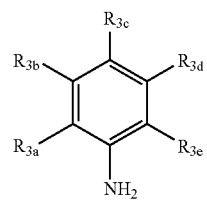

(21)

wherein $R_{3a}$, $R_{3b}$, $R_{3c}$, $R_{3d}$ and $R_{3e}$ each independently represents $SO_2R_{3f}$ ($R_{3f}$ representing OH, a halogen atom, ONa, OK or $OR_{3f1}$ ($R_{3f1}$ representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{3g}$ ($R_{3g}$ representing a H atom, a Na atom or a K atom), an acetamide group, an OPh group, a NHPh group, a $CF_3$ group, a $C_2F_5$ group or a $C_3F_7$ group (Ph indicating a phenyl group), of which at least one is $SO_2R_{3f}$; and in case plural units are present, $R_{3a}$, $R_{3b}$, $R_{3c}$, $R_{3d}$, $R_{3e}$, $R_{3f}$, $R_{3f1}$, and $R_{3g}$, have the aforementioned meanings independently for each unit.

The compound represented by the chemical formula (21) allows to obtain a polyhydroxyalkanoate having at least a unit represented by a chemical formula (3):

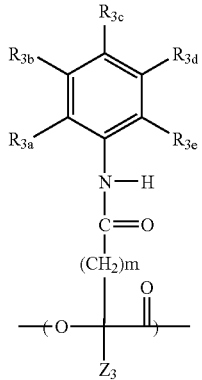

(3)

wherein $R_{3a}$, $R_{3b}$, $R_{3c}$, $R_{3d}$, $R_{3e}$, m and $Z_1$, and $R_{3f}$ $R_{3f1}$ and $R_{3g}$ described in the chemical formula (21) have the aforementioned meanings; m represents an integer selected from 0-8; and in case plural units are present, $R_{3a}$, $R_{3b}$, $R_{3c}$, $R_{3d}$, $R_{3e}$, $R_{3f}$ $R_{3f1}$, $R_{3g}$, m and $Z_1$ have the aforementioned meanings independently for each unit.

The compound represented by the chemical formula (21) can be p-aminobenzenesulfonic acid (sulfanylic acid), m-aminobenzenesulfonic acid, o-aminobenzenesulfonic acid, m-toluidine-4-sulfonic acid, o-toluidine-4-sulfonic acid sodium salt, p-toluidine-2-sulfonic acid, 4-methoxyaniline-2-sulfonic acid, o-anisidine-5-sulfonic acid, p-anisidine-3-sulfonic acid, 3-nitroaniline-4-sulfonic acid, 2-nitroaniline-4-sulfonic acid sodium salt, 4-nitroaniline-2-sulfonic acid sodium salt, 1,5-dinitroaniline-4-sulfonic acid, 2-aminophenol-4-hydroxy-5-nitrobenzenesulfonic acid, 2,4-dimethylaniline-5-sulfonic acid sodium salt, 2,4-dimethylaniline-6-sulfonic acid, 3,4-dimethylaniline-5-sulfonic acid, 4-isopropylaniline-6-sulfonic acid, 4-trifluoromethylaniline-6-sulfonic acid, 3-carboxy-4-hydroxyaniline-5-sulfonic acid, 4-carboxyaniline-6-sulfonic acid, or an alkali metal salt or an ester thereof.

In case $A_3$ is a substituted or unsubstituted naphthalene group, there can be employed an aminosulfonic acid compound represented by a chemical formula (22A) or (22B):

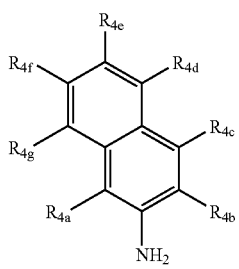

(22A)

wherein $R_{4a}$, $R_{4b}$, $R_{4c}$, $R_{4d}$, $R_{4e}$, $R_{4f}$ and $R_{4g}$ each independently represents $SO_2R_{4o}$ ($R_{4o}$ representing OH, a halogen atom, ONa, OK or $OR_{4o1}$ ($R_{4o1}$ representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$ ($R_{4p}$ representing a H atom, a Na atom or a K atom), an acetamide group, an OPh group, an NHPh group, a $CF_3$ group, a $C_2F_5$ group or a $C_3F_7$ group (Ph indicating a phenyl group), of which at least one is $SO_2R_{4o}$:

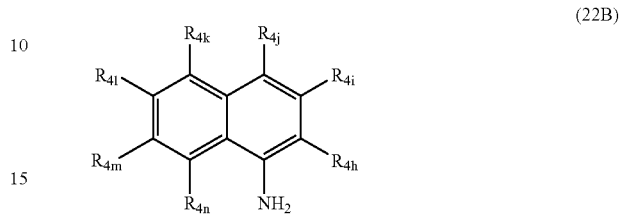

(22B)

wherein $R_{4h}$, $R_{4i}$, $R_{4j}$, $R_{4k}$, $R_{4l}$, $R_{4m}$ and $R_{4n}$ each independently represents $SO_2R_{4o}$, ($R_{4o}$ representing OH, a halogen atom, ONa, OK or $OR_{4o1}$ ($R_{4o1}$ representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$ ($R_{4p}$ representing a H atom, a Na atom or a K atom), an acetamide group, an OPh group, an NHPh group, a $CF_3$ group, a $C_2F_5$ group or a $C_3F_7$ group (Ph indicating a phenyl group), of which at least one is $SO_2R_{4o}$.

The compound represented by the chemical formula (22A) or (22B) allows to obtain a polyhydroxyalkanoate having at least a unit represented by the chemical formula (4A) or (4B).

The compound represented by the chemical formula (22A) or (22B) can be 1-naphthylamine-5-sulfonic acid, 1-naphthylamine-4-sulfonic acid, 1-naphthylamine-8-sulfonic acid, 2-naphthylamine-5-sulfonic acid, 1-naphthylamine-6-sulfonic acid, 1-naphthylamine-7-sulfonic acid, 1-naphthylamine-2-ethoxy-6-sulfonic acid, 1-amino-2-naphthol-4-sulfonic acid, 6-amino-1-naphthol-3-sulfonic acid, 1-amino-8-naphthol-2,4-sulfonic acid monosodium salt, 1-amino-8-naphthol-3,6-sulfonic acid monosodium salt, or an alkali metal salt or ester thereof.

In case $A_3$ represents a substituted or unsubstituted group having a heterocyclic structure comprising at least one of N, S and O, the heterocycle may be any of a pyridine ring, a piperazine ring, a furan ring and a thiol ring. The compound can be a sulfonic acid 2-aminopyridine-6-sulfonic acid or 2-aminopiperazine-6-sulfonic acid, or an alkali metal salt or ester thereof.

In case of a sulfonic acid ester, a group in an ester bonding with the sulfonic acid can be, as described above, a substituted or unsubstituted aliphatic hydrocarbon structure, a substituted or unsubstituted aromatic ring structure, or a substituted or unsubstituted heterocyclic structure. Also there is preferred a linear or branched alkyl group with 1-8 carbon atoms, or a substituted or unsubstituted phenyl group. In consideration for example of ease of esterification, there is further preferred $OCH_3$, $OC_2H_5$, $OC_6H_5$, $OC_3H_7$, $OC_4H_9$, $OCH(CH_3)_2$, $OCH_2C(CH_3)_3$, or $OC(CH_3)_3$.

(Producing Method for Polyhydroxyalkanoate Represented by Chemical Formula (1))

Now a reaction of the invention between a polyhydroxyalkanoate comprising a unit represented by the chemical formula (9) and the aminosulfonic acid compound represented by the chemical formula (10) will be explained in detail. In the invention, the compound of the chemical formula (10) is employed, with respect to the unit of the chemical formula (9)

employed as the starting material, in an amount of 0.1-50.0 times in moles, preferably 1.0-20.0 times in moles.

In the invention, an amide bond may be formed from a carboxylic acid and an amine for example by a condensation reaction by a dehydration under heating. Particularly in consideration of a mild reaction condition not causing a cleavage of an ester bond in the main polymer chain, there is effectively employed a method of activating a carboxylic acid portion with an activator to generate an active acyl intermediate, and then executing a reaction with an amine. The active acyl intermediate can be an acid halide, an acid anhydride or an active ester. In particular, a method of utilizing a condensing agent to form an amide bond within a same reaction environment for simplifying the production process. It is also possible, if necessary, to once isolate an acid halide and then to execute a condensation reaction with an amine.

The condensing agent to be employed can be suitably selected for example from a phosphate condensing agent employed in a polycondensation of an aromatic polyamide, a carbodiimide condensing agent employed in a peptide synthesis and an acid chloride condensing agent, depending on the compound of the chemical formula (10) and the polyhydroxyalkanoate having the unit shown in the chemical formula (9).

The phosphoric acid-based condensing agent can be a phosphite-based condensing agent, a phosphoric chloride-based condensing agent, a phosphoric anhydride-based condensing agent, a phosphoric ester-based condensing agent, or a phosphoric amide-based condensing agent. In the reaction of the invention, a condensing agent such as a phosphite ester. The phosphite ester to be employed can be, for example, triphenyl phosphite, diphenyl phosphite, tri-o-tolyl phosphite, tri-o-tolyl phosphite, tri-m-tolyl phosphite, di-m-tolyl phosphite, tri-p-tolyl phosphite, di-p-tolyl phosphite, di-o-chlorophenyl phosphite, tri-p-chlorophenyl phosphite, di-p-chlorophenyl phosphite, trimethyl phosphite, or triethyl phosphite, among which triphenyl phosphite is employed preferably. Also for improving a solubility and a reactivity of polymer, a metal salt such as lithium chloride or calcium chloride may be added.

The carbodiimide condensing agent can be dicyclohexyl carbodiimide (DCC), N-ethyl-N'-3-dimethylaminopropyl carbodiimide (EDC=WCSI), or diisopropyl carbodiimide (DIPC). DCC or WSCI may be employed in combination with N-hydroxysuccinimide (HONSu), 1-hydroxybenzotriazole (HOBt), or 3-hydroxy-4-oxo-3,4-dihydro-1,2,3-benzotriazole (HOObt).

The condensing agent is employed in an amount within a range of 0.1-50 times in moles, preferably 1-20 moles with respect to the unit represented by the chemical formula (9).

The reaction of the invention may employ a solvent if necessary. The solvent to be employed can be a hydrocarbon such as hexane, cyclohexane or heptane; a ketone such as acetone or methyl ethyl ketone; an other such as dimethyl ether, diethyl ether or tetrahydrofuran; a halogenated hydrocarbon such as dichloromethane, chloroform, carbon tetrachloride, dichloroethane or trichloroethane; an aromatic hydrocarbon such as benzene or toluene; a non-protonic polar solvent such as N,N-dimethylformamide, dimethylsulfoxide, dimethylacetamide, or hexamethylphosphoramide; a pyridine derivative such as pyridine or picoline; or N-methylpyrrolidone. Particularly preferably there is employed pyridine or N-methylpyrrolidone. An amount of the solvent may be suitable determined according to a starting material, a type of base, reaction conditions and the like. In the method of the invention, a reaction temperature is not particularly restricted, but is usually within a range from −20° C. to a boiling temperature of the solvent. However the reaction is desirably executed at an optimum temperature matching the condensing agent to be employed.

In the method of the invention, a reaction time is usually within a range of 1-48 hours, preferably 1-10 hours.

In the invention, a desired polyhydroxyalkanoate can be recovered and purified by an ordinary method such as a distillation, from a reaction liquid containing thus generated polyhydroxyalkanoate having the unit represented in the chemical formula (1). Otherwise, the desired polyhydroxyalkanoate indicated by the chemical formula (1) can be recovered by precipitation by uniformly mixing the reaction liquid with a solvent for example water, an alcohol such as methanol or ethanol, or an ether such as dimethyl ether, diethyl ether or tetrahydrofuran. If necessary, polyhydroxyalkanoate having the unit represented by the chemical formula (1) may be isolated and purified. Such isolation and purification are not particularly restricted, and may be executed for example by a precipitation with a solvent in which polyhydroxyalkanoate is insoluble, a column chromatography, or a dialysis.

Another producing method of the present invention, in case a portion R in the chemical formula (1) is —$A_1$—$SO_3H$, executes, after a condensation reaction with amine, a methyl esterification with a methyl esterifying agent to change the portion R in the chemical formula (1) into —$A_1$—$SO_3CH_3$. The methyl esterifying agent can be that employed in a methyl esterification of a fatty acid in a gas chromatography analysis. The methyl esterification can be executed by an acid catalyst method such as a hydrochloric acid-methanol method, a boron trifluoride-methanol method or a sulfuric acid-methanol method, or a base catalyst method such as a sodium methoxide method, a tetramethyl guanidine method or a trimethylsilyl diazomethane method. Among these, the trimethylsilyl diazomethane method is preferred as the methylation can be achieved under a mild condition.

The solvent to be employed in the reaction of the invention can be a hydrocarbon such as hexane, cyclohexane or heptane; an alcohol such as methanol or ethanol; a halogenated hydrocarbon such as dichloromethane, chloroform, carbon tetrachloride, dichloroethane or trichloroethane; or an aromatic hydrocarbon such as benzene or toluene, particularly preferably a halogenated hydrocarbon. An amount of the solvent may be suitable determined according to a starting material, reaction conditions and the like. In the method of the invention, a reaction temperature is not particularly restricted, but is usually within a range from −20° C. to 30° C. However the reaction is desirably executed at an optimum temperature matching the condensing agent and the reagents to be employed.

Polyhydroxyalkanoate having a unit represented by a chemical formula (15) can be produced by a step of reacting a polyhydroxyalkanoate having a unit represented by a chemical formula (11) with a base, and a step of reacting a compound obtained in the aforementioned step with a compound represented by a chemical formula (14).

More specifically, in polyhydroxyalkanoate constituted of a unit of a substituted α-hydroxy acid represented by the chemical formula (11) for use in the invention, $Z_{11}$ represents a linear or branched alkyl group, an aryl group or an aralkyl group substituted with an aryl group. Specifically, the linear or branched alkyl group can be a methyl group, an ethyl group, a propyl group, an isopropyl group (2-methylpropyl group), a butyl group, a 1-methylpropyl group, a pentyl group, an isopropyl group (3-methylbutyl group), a hexyl group, an isohexyl group (4-methylpentyl group), or a heptyl group. Also an aryl group can be a phenyl group or a methylphenyl group. Also an aralkyl group can be a phenylmethyl group (benzyl group), a phenylethyl group, a phenylpropyl group, a phenylbutyl group, a phenylpentyl group or a methylbenzyl group. In the invention, in consideration of productivity, $Z_{11}$ is preferably a methyl group, an ethyl group, a propyl group, an isopropyl group, a pentyl group, a hexyl group, a phenyl group or a phenylmethyl group.

Also a compound represented by the chemical formula (14) can be 2-acrylamide-2-methylpropanesulfonic acid, an alkali metal salt thereof or an ester thereof.

(Producing Method for Polyhydroxyalkanoate Represented by Chemical Formula (15))

Now there will be explained the reaction between polyhydroxyalkanoate having a unit represented by the chemical formula (11) and the compound represented by the chemical formula (14).

The present invention can be achieved by executing a Michael addition reaction of the compound represented by the chemical formula (14) with an α-methine group adjacent to a carbonyl group in the polymer main chain. More specifically, under a reaction condition of Michael reaction, a polyhydroxyalkanoate having a unit represented by the chemical formula (11) is reacted with a base capable of forming an anion in the α-methine group adjacent to a carbonyl group in the polymer main chain of the polyhydroxyalkanoate having the unit represented by the chemical formula (11), and then with the compound represented by the chemical formula (14). In the invention, the compound represented by the chemical formula (14) is employed in an amount of 0.001-100 times in moles, preferably 0.01-10 times in moles, with respect to the unit represented by the chemical formula (11).

A solvent in the reaction of the invention is not particularly restricted as long as it is inert to the reaction and is capable of dissolving the starting material to a certain extent, but can be an aliphatic hydrocarbon such as hexane, cyclohexane, heptane, ligroin or petroleum ether; an aromatic hydrocarbon such as benzene, toluene or xylene; an ether such as diethyl ether, diisopropyl ether, tetrahydrofuran, dioxane, dimethoxyethane or diethylene glycol dimethyl ether; or an amide such as formamide, N,N-dimethylformamide, N,N-dimethylacetamide, N-methyl-2-pyrrolidone, N-methylpyrrolidone or hexamethyl phosphorotriamide, preferably tetrahydrofuran.

The reaction is executed in the presence of a base. The base to be employed can be an alkyl lithium such as methyl lithium or butyl lithium; an alkali metal disilazide such as lithium hexamethyl disilazide, sodium hexamethyl disilazide, or potassium hexamethyl disilazide; or a lithium amide such as lithium diisopropylamide or lithium dicyclohexylamide, preferably lithium diisopropylamide. In the invention, the base is employed in an amount of 0.001-100 times in moles, preferably 0.01-10 times in moles, with respect to the unit represented by the chemical formula (11).

In the method of the invention, a reaction temperature is usually −78° C. to 40° C., preferably −78° C. to 30° C.

In the method of the invention, a reaction time is usually within a range of 10 minutes to 24 hours, preferably 10 minutes to 4 hours.

On the other hand, in the polyhydroxyalkanoate having a unit represented by the chemical formula (5) of the invention, a polyhydroxyalkanoate having a unit represented by a chemical formula (8) can be produced by a method of employing a polyhydroxyalkanoate having a unit represented by a chemical formula (7) and hydrolyzing a side chain ester portion in the presence of an acid or an alkali, or executing a hydrogenolysis comprising a catalytic reduction.

More specifically, in polyhydroxyalkanoate constituted of a unit represented by the chemical formula (7) for use in the invention, $Z_7$ as a linear or branched alkyl group can be a methyl group, an ethyl group, a propyl group, an isopropyl group (2-methylpropyl group), a butyl group, a 1-methylpropyol group, a pentyl group, an isopropyl group (3-methylbutyl group), a hexyl group, an isohexyl group (4-methylpentyl group), or a heptyl group. Also an aryl group can be a phenyl group or a methylphenyl group. Also an aralkyl group can be a phenylmethyl group (benzyl group), a phenylethyl group, a phenylpropyl group, a phenylbutyl group, a phenylpentyl group or a methylbenzyl group. In the invention, in consideration of productivity, $Z_{11}$ is preferably a methyl group, an ethyl group, a propyl group, an isopropyl group, a pentyl group, a hexyl group, a phenyl group or a phenylmethyl group.

(Producing Method for Polyhydroxyalkanoate Represented by Chemical Formula (8))

In the following, there will be explained a method of procuring a polyhydroxyalkanoate having a unit represented by a chemical formula (8) by a method of employing a polyhydroxyalkanoate having a unit represented by a chemical formula (7) and hydrolyzing a side chain ester portion thereof in the presence of an acid or an alkali, or executing the hydrogenolysis comprising a catalytic reduction.

In the method of hydrolysis in the presence of an acid or an alkali, there can be employed, in an aqueous solution or in a hydrophilic solvent such as methanol, ethanol, tetrahydrofuran, dioxane, dimethylformamide or dimethylsulfoxide, an aqueous solution of an inorganic acid such as hydrochloric acid, sulfuric acid, nitric acid or phosphoric acid, or an organic acid such as trifluoroacetic acid, trichloroacetic acid, p-toluenesulfonic acid or methanesulfonic acid, an aqueous solution of an aqueous caustic alkali such as sodium hydroxide or potassium hydroxide, or an aqueous solution of an alkali carbonate such as sodium carbonate or potassium carbonate, or an alcohol solution of a metal alkoxide such as sodium methoxide or sodium ethoxide. A reaction temperature is usually 0 to 40° C., preferably 0 to 30° C. A reaction time is usually 0.5 to 48 hours. However a hydrolysis with any acid or alkali may cause a cleavage of the ester bond of the main chain, resulting in a decrease in the molecular weight.

Preparation of a carboxylic acid by hydrogenolysis comprising catalytic reduction is executed in the following manner. A catalytic reduction is executed by reacting hydrogen under a normal or elevated pressure in a suitable solvent and in the presence of a reduction catalyst, at a temperature within a range of −20° C. to the boiling point of the employed solvent, preferably 0 to 50° C. The solvent to be employed can be, for example, water, methanol, ethanol, propanol, hexafluoroisopropanol, ethyl acetate, diethyl ether, tetrahydrofuran, dioxane, benzene, toluene, dimethylformamide, pyridine, or N-methylpyrrolidone. Also, a mixture of these may be employed. The reduction catalyst to be employed can be a single catalyst or a catalyst carried on a carrier, such as of palladium, platinum, or rhodium, or Raney nickel. A reaction time is usually 0.5 to 72 hours. A reaction liquid containing thus generated polyhydroxyalkanoate having a unit represented by the chemical formula (8) is subjected to a filtration for eliminating the catalyst and a solvent elimination for example by a distillation to recover a crude polymer. The obtained polyhydroxyalkanoate having a unit represented by the chemical formula (8) can be, if necessary, isolated and purified. Such isolation and purification are not particularly restricted, and may be executed for example by a re-precipitation with a solvent in which the polyhydroxyalkanoate having a unit represented by the chemical formula (8) is insoluble, a column chromatography, or a dialysis. However even a catalytic reduction may also cause a cleavage of the ester bond of the main chain, resulting in a decrease in the molecular weight.

(Producing Method for Polyhydroxyalkanoate Represented by Chemical Formula (23))

Also in the polyhydroxyalkanoate having a unit represented by the chemical formula (5) of the invention, a polyhydroxyalkanoate having a unit represented by a chemical formula (23) can be produced by an esterification, employing a polyhydroxyalkanoate having a unit represented by a chemical formula (24) as a starting material and employing an esterifying agent.

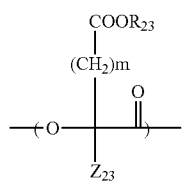
(23)

wherein $R_{23}$ represents a linear or branched alkyl group with 1-12 carbon atoms, an aralkyl group or a substituent having a sugar; m represents an integer selected from 0-8; $Z_{23}$ represents a linear or branched alkyl group, an aryl group or an aralkyl group substituted with an aryl group; however $R_{23}$ only represents a substituent having a sugar in case $Z_{23}$ is a methyl group and m is 0-1; and in case plural units are present, $R_{23}$, m and $Z_{23}$ have the aforementioned meanings independently for each unit:

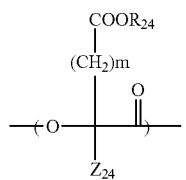
(24)

wherein $R_{24}$ represents hydrogen, or a group capable of forming a salt; m represents an integer selected from 0-8; $Z_{24}$ represents a linear or branched alkyl group, an aryl group or an aralkyl group substituted with an aryl group; and in case plural units are present, $R_{24}$, m and $Z_{24}$ have the aforementioned meanings independently for each unit.

As the esterifying agent, diazomethane and a DMF dimethylacetal can be employed. For example, a polyhydroxyalkanoate having a unit represented by a chemical formula (24) easily reacts with trimethylsilyldiazomethane, DMF dimethyl acetal, DMF diethylacetal, DMF dipropylacetal, DMF-t-butylacetal, or DMF dineopentylacetal to provide a corresponding ester. Also an esterified polyhydroxyalkanoate can be obtained by a reaction, utilizing an acid catalyst or a condensing agent such as DCC, with an alcohol such as methanol, ethanol, propanol, isopropyl alcohol, butyl alcohol, sec-butyl alcohol, tert-butyl alcohol, pentyl alcohol, neopentyl alcohol, hexyl alcohol, heptyl alcohol, octyl alcohol, nonyl alcohol, decyl alcohol or lauryl alcohol, or with a sugar for introducing a sugar structure, such as D-glucose or D-fructose.

Also a polyhydroxyalkanoate having a unit represented by a chemical formula (13) can be produced by a step of reacting a polyhydroxyalkanoate having a unit represented by a chemical formula (11) with a base, and a step of reacting a compound obtained in the aforementioned step with a compound represented by a chemical formula (12).

The compound (13) can also be produced through a cyclic compound capable of a ring-opening polymerization.

More specifically, in polyhydroxyalkanoate constituted of a unit represented by the chemical formula (11) for use in the invention, $Z_{11}$ represents a linear or branched alkyl group, an aryl group or an aralkyl group substituted with an aryl group. Specifically, the linear or branched alkyl group can be a methyl group, an ethyl group, a propyl group, an isopropyl group (2-methylpropyl group), a butyl group, a 1-methylpropyol group, a pentyl group, an isopropyl group (3-methylbutyl group), a hexyl group, an isohexyl group (4-methylpentyl group), or a heptyl group. Also an aryl group can be a phenyl group or a methylphenyl group. Also an aralkyl group can be a phenylmethyl group (benzyl group), a phenylethyl group, a phenylpropyl group, a phenylbutyl group, a phenylpentyl group or a methylbenzyl group. In the invention, in consideration of productivity in the polymer synthesis, $Z_{11}$ is preferably a methyl group, an ethyl group, a propyl group, an isopropyl group, a pentyl group, a hexyl group, a phenyl group or a phenylmethyl group.

Examples of the compound represented by the chemical formula (12) include methyl chloroformate, ethyl chloroformate, propyl chloroformate, isopropyl chloroformate, butyl chloroformate, cyclohexyl chloroformate, benzyl chloroformate, methyl bromoformate, ethyl bromoformate, propyl bromoformate, isopropyl bromoformate, butyl bromoformate, cyclohexyl bromoformate, benzyl bromoformate, methyl chloroacetate, ethyl chloroacetate, propyl chloroacetate, isopropyl chloroacetate, butyl chloroacetate, cyclohexyl chloroacetate, benzyl chloroacetate, methyl bromoacetate, ethyl bromoacetate, propyl bromoacetate, isopropyl bromoacetate, butyl bromoacetate, cyclohexyl bromoacetate, benzyl bromoacetate, methyl 3-chloropropionate, ethyl 3-chloropropionate, propyl 3-chloropropionate, isopropyl 3-chloropropionate, butyl 3-chloropropionate, cyclohexyl 3-chloropropionate, benzyl 3-chloropropionate, methyl 3-bromopropionate, ethyl 3-bromopropionate, propyl 3-bromopropionate, isopropyl 3-bromopropionate, butyl 3-bromopropionate, cyclohexyl 3-bromopropionate, benzyl 3-bromopropionate, methyl 4-chlorobutyrate, ethyl 4-chlorobutyrate, propyl 4-chlorobutyrate, isopropyl 4-chlorobutyrate, butyl 4-chlorobutyrate, cyclohexyl 4-chlorobutyrate, benzyl 4-chlorobutyrate, methyl 4-bromobutyrate, ethyl 4-bromobutyrate, propyl 4-bromobutyrate, isopropyl 4-bromobutyrate, butyl 4-bromobutyrate, cyclohexyl 4-bromobutyrate, benzyl 4-bromobutyrate, methyl 5-chlorovalerate, ethyl 5-chlorovalerate, propyl 5-chlorovalerate, isopropyl 5-chlorovalerate, butyl 5-chlorovalerate, cyclohexyl 5-chlorovalerate, benzyl 5-chlorovalerate, methyl 5-bromovalerate, ethyl 5-bromovalerate, propyl 5-bromovalerate, isopropyl 5-bromovalerate, butyl 5-bromovalerate, cyclohexyl 5-bromovalerate, benzyl 5-bromovalerate, methyl 6-chlorohexanoate, ethyl 6-chlorohexanoate, propyl 6-chlorohexanoate, isopropyl 6-chlorohexanoate, butyl 6-chlorohexanoate, cyclohexyl 6-chlorohexanoate, benzyl 6-chlorohexanoate, methyl 6-bromohexanoate, ethyl 6-bromohexanoate, propyl 6-bromohexanoate, isopropyl 6-bromohexanoate, butyl 6-bromohexanoate, cyclohexyl 6-bromohexanoate, benzyl 6-bromohexanoate, methyl 7-chloroheptanoate, ethyl 7-chloroheptanoate, propyl 7-chloroheptanoate, isopropyl 7-chloroheptanoate, butyl 7-chloroheptanoate, cyclohexyl 7-chloroheptanoate, benzyl 7-chloroheptanoate, methyl 7-bromoheptanoate, ethyl 7-bromoheptanoate, propyl 7-bromoheptanoate, isopropyl 7-bromoheptanoate, butyl 7-bromoheptanoate, cyclohexyl 7-bromoheptanoate, benzyl 7-bromoheptanoate, methyl 8-chlorooctanoate, ethyl 8-chlorooctanoate, propyl 8-chlorooctanoate, isopropyl 8-chlorooctanoate, butyl 8-chlorooctanoate, cyclohexyl 8-chlorooctanoate, benzyl 8-chlorooctanoate, methyl 8-bromooctanoate, ethyl 8-bromooctanoate, propyl 8-bromooctanoate, isopropyl 8-bromooctanoate, butyl 8-bromooctanoate, cyclohexyl 8-bromooctanoate, benzyl 8-bromooctanoate, methyl 9-chlorononanoate, ethyl 9-chlorononanoate, propyl 9-chlorononanoate, isopropyl 9-chlorononanoate, butyl 9-chlorononanoate, cyclohexyl 9-chlorononanoate, benzyl 9-chlorononanoate, methyl 9-bromononanoate, ethyl 9-bromononanoate, propyl 9-bromononanoate, isopropyl 9-bromononanoate, butyl 9-bromononanoate, cyclohexyl 9-bromononanoate, and benzyl 9-bromononanoate.

(Producing Method for Polyhydroxyalkanoate Represented by Chemical Formula (13))

Now there will be explained the reaction between polyhydroxyalkanoate having a unit represented by the chemical formula (11) and the compound represented by the chemical formula (12).

The present invention can be achieved by executing an addition reaction of the compound represented by the chemical formula (12) with an α-methine group adjacent to a carbonyl group in the polymer main chain. More specifically, under a condition of addition reaction, a polyhydroxyalkanoate having a unit represented by the chemical formula (11) is reacted with a base capable of forming an anion in the α-methine group adjacent to a carbonyl group in the polymer main chain of the polyhydroxyalkanoate having the unit represented by the chemical formula (11), and the compound represented by the chemical formula (12) is then reacted. In the invention, the compound represented by the chemical formula (12) is employed in an amount of 0.001-100 times in moles, preferably 0.01-10 times in moles, with respect to the unit represented by the chemical formula (11).

A solvent in the reaction of the invention is not particularly restricted as long as it is inert to the reaction and is capable of dissolving the starting material to a certain extent, but can be an aliphatic hydrocarbon such as hexane, cyclohexane, heptane, ligroin or petroleum ether; an aromatic hydrocarbon such as benzene, toluene or xylene; an ether such as diethyl ether, diisopropyl ether, tetrahydrofuran, dioxane, dimethoxyethane or diethylene glycol dimethyl ether; or an amide such as formamide, N,N-dimethylformamide, N,N-dimethylacetamide, N-methyl-2-pyrrolidone, N-methylpyrrolidone or hexamethyl phosphorotriamide, preferably tetrahydrofuran.

The reaction is executed in the presence of a base. The base to be employed can be an alkyl lithium such as methyl lithium or butyl lithium; an alkali metal disilazide such as lithium hexamethyl disilazide, sodium hexamethyl disilazide, or potassium hexamethyl disilazide; or a lithium amide such as lithium diisopropylamide or lithium dicyclohexylamide, preferably lithium diisopropylamide. In the invention, the base is employed in an amount of 0.001-100 times in moles, preferably 0.01-10 times in moles, with respect to the unit represented by the chemical formula (11).

In the method of the invention, a reaction temperature is usually −78° C. to 40° C., preferably −78° C. to 30° C.

In the method of the invention, a reaction time is usually within a range of 10 minutes to 24 hours, preferably 10 minutes to 4 hours.

The polyhydroxyalkanoate constituted of a unit of substituted α-hydroxy acid represented by the chemical formula (11) to be employed in the invention can be synthesized by a known method. For example, a polyester can be produced directly from an α-hydroxy acid. Otherwise, it can be produced, prior to polymerization, by converting an α-hydroxy acid into a derivative of a high polymerization activity and then executing a ring-opening polymerization.

(Producing Method of Polyhydroxyalkanoate Constituted of a Unit of Substituted α-hydroxy Acid Represented by the Chemical Formula (11) from Substituted α-hydroxy Acid)

A polyhydroxyalkanoate constituted of a unit of substituted α-hydroxy acid represented by the chemical formula (11) can be obtained by refluxing a substituted α-hydroxy acid with a polymerization catalyst in an organic solvent and removing water, generated in the course of polymerization, from the reaction system, thereby promoting a condensation polymerization.

(a) Polymerization Catalyst

In the condensation polymerization of substituted α-hydroxy acid, there can be employed a polymerization catalyst for example a metal such as tin powder or zinc powder, a metal oxide such as tin oxide, zinc oxide, magnesium oxide, titanium oxide, or aluminum oxide, a metal halide such as tin dichloride, tin tetrachloride, tin dibromide, tin tetrabromide, zinc chloride, magnesium chloride or aluminum chloride, tetraphenyl tin, tin octylate or p-toluenesulfonic acid.

An amount of the polymerization catalyst is 0.001-10 mass %, preferably 0.01-5 mass % with respect to substituted α-hydroxy acid.

(b) Polymerization Solvent

A solvent to be employed in the condensation polymerization of substituted α-hydroxy acid is preferably a solvent that can be easily separated from water. Examples of the solvent include toluene, xylene, mesitylene, 1,2,3,5-tetramethylbenzene, chlorobenzene, 1,2-dichlorobenzene, 1,3-dichlorobenzene, bromobenzene, 1,2-dibromobenzene, 1,3-dibromobenzene, iodobenzene, 1,2-diiodobenzene, diphenyl ether, or dibenzyl ether, which may also be employed as a mixture.

The solvent is preferably employed in an amount in which the substituted α-hydroxy acid represents a concentration of 5-50 mass %.

(c) Polymerization Condition

In the condensation polymerization of substituted α-hydroxy acid, a polymerization temperature is, in consideration of a polymer generating speed and a thermal composition rate of the generated polymer, is within a range of 50-200° C., preferably 110-180° C. The condensation polymerization reaction is normally executed under an atmospheric pressure and at a distilling temperature of an organic solvent to be employed. In case of employing an organic solvent of a high boiling point, it may be executed under a reduced pressure. The condensation polymerization of substituted α-hydroxy acid is preferably executed under an inert gas atmosphere, and may be executed under replacement of the interior of the reaction apparatus with an inert gas or under a bubbling with an inert gas. Water generated in the course of polymerization is suitably removed from the reaction apparatus.

A number-averaged molecular weight of the polyester obtained by the polymerization is variable depending on the conditions such as a type of the polymerization solvent, a type and an amount of the polymerization catalyst a polymerization temperature and a polymerization time and the like, but, in consideration of a reaction in a succeeding step, is preferably within a range of 1,000-1,000,000 in a conversion as polystyrene.

(Producing Method of Polyhydroxyalkanoate Constituted of a Unit of Substituted α-hydroxy Acid Represented by the Chemical Formula (11) from a Cyclic Dimer of a Substituted α-hydroxy Acid)

A polyester can be produced by executing a two-molecule dehydration of substituted α-hydroxy acid to form a cyclic diester, then preparing a cyclic dimmer lactide as a derivative of substituted α-hydroxy acid, and executing a ring-opening polymerization of the substituted α-hydroxy acid. The ring-opening polymerization generally has a high polymerization rate and can produce a polyester of a high polymerization degree.

A cyclic diester by a two-molecule dehydration of substituted α-hydroxy acid can be obtained with a high yield, for example, in a reactor equipped with a Dean-Stark trap, by subjecting a substituted α-hydroxy acid and a catalyst promoting a dehydration condensation such as p-toluenesulfonic acid to an azeotropic dehydration in toluene and under a nitrogen atmosphere for 30 hours and suitably removing the water accumulated in the Dean-Stark trap.

A desired polyester can also be obtained by adding a polymerization catalyst to a cyclic dimer lactide and executing a ring-opening polymerization in an inert gas atmosphere.

(a) Polymerization Catalyst

In the ring-opening polymerization of cyclic dimer lactide, there can be employed a polymerization catalyst for example a metal such as tin powder or zinc powder, a metal oxide such as tin oxide, zinc oxide, magnesium oxide, titanium oxide, or aluminum oxide, a metal halide such as tin dichloride, tin tetrachloride, tin dibromide, tin tetrabromide, zinc chloride, magnesium chloride or aluminum chloride, tetraphenyl tin, or tin octylate.

An amount of the polymerization catalyst is 0.001-10 mass %, preferably 0.01-5 mass % with respect to cyclic dimer lactide.

(b) Polymerization Condition

In the ring-opening polymerization of cyclic dimer lactide, a polymerization temperature is, in consideration of a polymer generating speed and a thermal composition rate of the generated polymer, is within a range of 100-200° C., preferably 120-180° C.

The ring-opening polymerization of cyclic dimer lactide is preferably executed under an inert gas atmosphere, such as nitrogen or argon gas.

A number-averaged molecular weight of the polyester obtained by the polymerization is variable depending on the conditions such as a type of the polymerization solvent, a type and an amount of the polymerization catalyst, a polymerization temperature and a polymerization time and the like. In case of polyhydroxyalkanoate constituted of a unit of substituted α-hydroxy acid represented by the chemical formula (11) to be employed in the present invention, in consideration of a reaction in a succeeding step, the molecular weight is preferably within a range of 1,000-1,000,000 in conversion as polystyrene.

Polyhydroxyalkanoate of the invention is principally constituted of the unit represented by the foregoing chemical formula (1) or (5), but may also be constructed as a copolymer containing a second component, in order to modify physical properties such as mechanical characteristics or decomposition characteristics. For example a unit represented by the chemical formula (6) may be further included in the molecule.

The second component can specifically be an α-hydroxycarboxylic acid or an ω-hydroxycarboxylic acid. Specific examples of α-hydroxycarboxylic acid include α-hydroxypropionic acid (lactic acid), α-hydroxybutyric acid, α-hydroxyisobutyric acid, α-hydroxyvaleric acid, α-hydroxyisovaleric acid, α-hydroxy-α-methylbutyric acid, α-hydroxycaproic acid, α-hydroxyisocaproic acid, α-hydroxy-β-methylvaleric acid, α-hydroxyheptanoic acid, mandelic acid and β-phenyllactic acid. Also in case of presence of an asymmetric carbon, there may be employed an L-isomer, a D-isomer, a racemic body or a meso-form thereof. Specific examples of ω-hydroxycarboxylic acid include β-hydroxypropionic acid, β-hydroxybutyric acid, β-hydroxyvaleric acid, β-hydroxyhexanoic acid, β-hydroxyisohexanoic acid, β-hydroxy-β-methylvaleric acid, γ-hydroxybutyric acid, γ-hydroxyvaleric acid, δ-hydroxyvaleric acid, δ-hydroxyhexanoic acid, and ε-hydroxyhexanoic acid, but such examples are not restrictive.

A number-averaged molecular weight of polyhydroxyalkanoate obtained by the invention can have various values depending on conditions such as a reaction time and a reaction temperature. The optimum number-averaged molecular weight of polyhydroxyalkanoate is variable depending on a desired function, but, for example in an application for a medical soft member, the polyhydroxyalkanoate preferably has a number-averaged molecular weight of 1,000-1,000,000.

The molecular weight of polyhydroxyalkanoate of the invention can be measured as a relative molecular weight or an absolute molecular weight. In a simpler method, it can be measured for example by GPC (gel permeation chromatography). In a GPC measurement, polyhydroxyalkanoate is dissolved in a solvent and subjected to a measurement in a moving phase. A detector such as a differential refractive index detector (RI) or an ultraviolet detector (UV) can be employed according to the polyhydroxyalkanoate to be measured. The molecular weight is obtained as a relative value in a comparison with a sample (polystyrene or polymethyl methacrylate). The solvent can be selected from those capable of dissolving the polymer, such as dimethylformamide (DMF), dimethyl sulfoxide (DMSO), chloroform, tetrahydrofuran (THF), toluene or hexafluoroisopropanol (HFIP). In case of a polar solvent, the measurement can also be executed by a salt addition.

A number-averaged molecular weight of polyhydroxyalkanoate obtained by the invention can have various values depending on conditions such as a reaction time and a reaction temperature. The optimum number-averaged molecular weight of polyhydroxyalkanoate is variable depending on a desired function, but, for example in an application for a medical soft member, the polyhydroxyalkanoate preferably has a number-averaged molecular weight of 1,000-1,000,000. Also it is preferable that the polyhydroxyalkanoate has a ratio (Mw/Mn) of the weight-averaged molecular weight (Mw) and the number-averaged molecular weight (Mn) within a range of 1-10.

In the chemical reaction of the invention, a reaction solvent, a reaction temperature, a reaction time, a purification method and the like are not limited to those described in the foregoing.

EXAMPLES

In the following, the present invention will be clarified further by examples, but the present invention is not limited to such examples.

Example 1

Polyester Synthesis Utilizing Phenyllactide 29.63 g (100.0 mmol) of phenyllactide, 4.0 ml of a 0.1M toluene solution of tin octylate (tin 2-ethylhexanoate) and 4.0 ml of a 0.1M toluene solution of p-tert-butylbenzyl alcohol were charged in a polymerization ampoule, then subjected to a drying for 1 hour under a reduced pressure and a nitrogen replacement, and the ampoule was sealed by fusing under a reduced pressure and heated at 180° C. to execute a ring-opening polymerization. The reaction was terminated after 10 hours and the mixture was cooled. An obtained polymer was dissolved in chloroform, and was re-precipitated in methanol of a 10 times amount of that of chloroform required for dissolving. The precipitate was recovered and dried under a reduced pressure to obtain 24.00 g of a polymer. An NMR analysis was conducted under following conditions for specifying the structure of the obtained compound.

<Measuring instrument> FT-NMR: Bruker DPX400
resonance frequency: $^1H$=400 MHz
<Measuring condition>
measured species: $^1H$
solvent: TMS/CDCl$_3$
temperature: room temperature As a result, the obtained compound was confirmed as a polyhydroxyalkanoate containing a unit represented by a chemical formula (201) as the monomer unit:

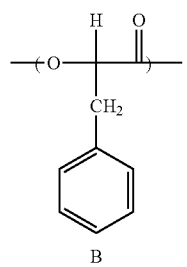

(201)

B

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=35,000 and a weight-averaged molecular weight Mw=49,000.

Example 2

Polyester Synthesis Utilizing L-lactide 14.41 g (100.0 mmol) of L-lactide, 4.0 ml of a 0.1M toluene solution of tin octylate (tin 2-ethylhexanoate) and 4.0 ml of a 0.1M toluene solution of p-tert-butylbenzyl alcohol were charged in a polymerization ampoule, then subjected to a drying for 1 hour under a reduced pressure and a nitrogen replacement, and the ampoule was sealed by fusing under a reduced pressure and heated at 160° C. to execute a ring-opening polymerization. The reaction was terminated after 10 hours and the mixture was cooled. An obtained polymer was dissolved in chloroform, and was re-precipitated in methanol of a 10 times amount of that of chloroform required for dissolving. The precipitate was recovered and dried under a reduced pressure to obtain 12.68 g of a polymer. An NMR analysis conducted under conditions same as in Example 1 for specifying the structure of the obtained compound confirmed a polyhydroxyalkanoate containing a unit represented by a chemical formula (202).

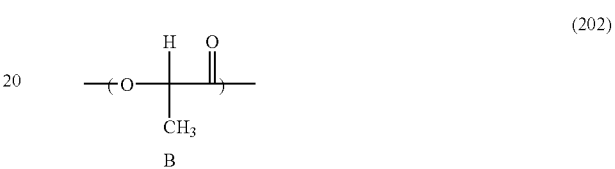

B

An average molecular weight of the obtained polyhydroxyalkanoate, measured under conditions same as in Example 1, was found as a number-averaged molecular weight Mn=42,800 and a weight-averaged molecular weight Mw=59,100.

Example 3

Polyester Synthesis Utilizing Ethylglycolide
(3,6-diethyl-1,4-dioxane-2,5-dione)

A process was conducted in the same manner as in Example 2 except for employing 17.22 g (100.0 mmol) of ethylglycolide instead of L-lactide, to obtain 12.05 g of a polymer. An NMR analysis conducted on the obtained polymer under conditions same as in Example 1 confirmed a polyhydroxyalkanoate containing a unit represented by a chemical formula (203).

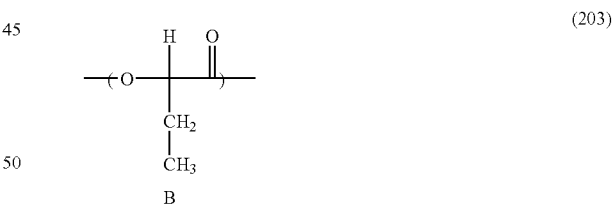

B

An average molecular weight of the obtained polyhydroxyalkanoate, measured under conditions same as in Example 1, was found as a number-averaged molecular weight Mn=37,500 and a weight-averaged molecular weight Mw=53,300.

Example 4

Polyester Synthesis Utilizing Diisopropyl Glycolide
(3,6-diisopropyl-1,4-dioxane-2,5-dione)

A process was conducted in the same manner as in Example 2 was reproduced except for employing 22.83 g (100.0 mmol) of diisopropyl glycolide instead of L-lactide, to obtain 14.15 g of a polymer.

An NMR analysis conducted on the obtained polymer under conditions same as in Example 1 confirmed a polyhydroxyalkanoate containing a unit represented by a chemical formula (204).

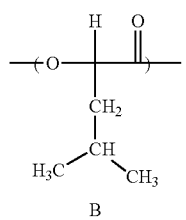

(204)

An average molecular weight of the obtained polyhydroxyalkanoate, measured under conditions same as in Example 1, was found as a number-averaged molecular weight Mn=32,800 and a weight-averaged molecular weight Mw=48,500.

Example 5

Polyester Synthesis Utilizing Hexylglycolide (3,6-dihexyl-1,4-dioxane-2,5-dione)

A process was conducted in the same manner as in Example except for employing 25.63 g (100.0 mmol) of hexyl glycolide instead of L-lactide, to obtain 16.66 g of a polymer. An NMR analysis conducted on the obtained polymer under conditions same as in Example 1 confirmed a polyhydroxyalkanoate containing a unit represented by a chemical formula (205).

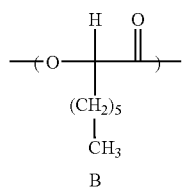

(205)

An average molecular weight of the obtained polyhydroxyalkanoate, measured under conditions same as in Example 1, was found as a number-averaged molecular weight Mn=28,900 and a weight-averaged molecular weight Mw=42,200.

Example 6

10.00 g of polyhydroxyalkanoate obtained in Example 1 and constituted of a unit represented by the chemical formula (201) were placed in an eggplant-shaped flask, and dissolved by adding 500 ml of THF. The solution was placed under a nitrogen atmosphere and agitated at −78° C. Then 33.75 ml (67.5 mmol) of a 2M THF solution of lithium diisopropylamide were slowly added and the mixture was agitated for 30 minutes at −78° C. Then 11.58 g (130.5 mmol) of benzyl chloroformate were added and the mixture was agitated for 30 minutes at the room temperature. After the reaction, the reaction mixture was poured into 1000 ml of an aqueous solution of ammonium chloride, then 500 ml of dichloromethane were added and the organic layer was separated. The organic layer was recovered after washing three times with 250 ml of water, and the solvent was distilled off to recover a crude polymer. It was then dissolved in 60 ml of THF, and was re-precipitated in methanol of a 50-times amount of that of THF required for dissolving. The precipitate was recovered and dried under a reduced pressure to obtain 8.03 g of polymer. An NMR analysis conducted under conditions same as in Example 1 for specifying the structure of the obtained polymer confirmed a polyhydroxyalkanoate containing units represented by a chemical formula (206) as monomer units. It was also confirmed that a proportion of the monomer units was unit A by 11 mol % and unit B by 89 mol %.

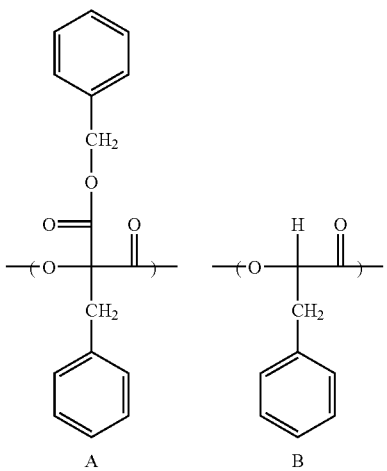

(206)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=28,500 and a weight-averaged molecular weight Mw=41,000.

5.00 g of the obtained polyhydroxyalkanoate copolymer, represented by the chemical formula (106), was dissolved in 500 ml of a dioxane-ethanol mixed solvent (75:25), then 1.10 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then dissolved in chloroform, and re-precipitated from methanol of a 10-times amount. The obtained polymer was recovered and dried under a reduced pressure to obtain 3.66 g of a polymer. An NMR analysis conducted under conditions same as in Example 1 for specifying the structure of the obtained compound confirmed a polyhydroxyalkanoate copolymer containing units represented by a chemical formula (207) as monomer units. Also a proportion of the monomer units was confirmed as unit C by 11 mol % and unit D by 89 mol %.

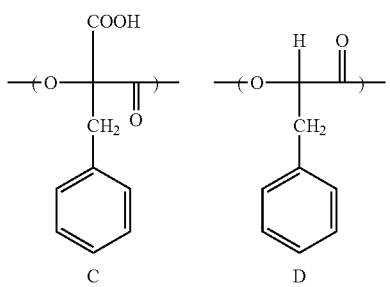

(207)

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=22,500 and a weight-averaged molecular weight Mw=33,800.

30 mg of the obtained polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 29 mg of polyhydroxyalkanoate.

An NMR analysis on the obtained polyhydroxyalkanoate conducted under conditions same as in Example 1 confirmed that the carboxyl group of the unit C was converted into a methyl carboxylate ester and that the obtained polymer could be esterified again.

Example 7

A process was conducted in the same manner as in Example 6 except for employing 15.53 g (130.5 mmol) of benzyl bromoacetate instead of benzyl chloroformate, to obtain 8.70 g of a polymer. An NMR analysis conducted on the obtained polymer under conditions same as in Example 1 confirmed a polyhydroxyalkanoate containing units represented by a chemical formula (208) as monomer units, with a proportion of unit A by 10 mol % and unit B by 90 mol %.

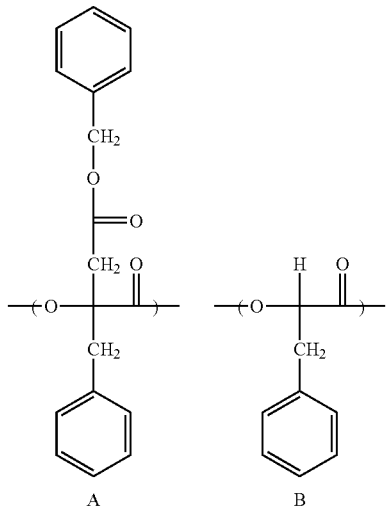

(208)

An average molecular weight of the obtained polyhydroxyalkanoate, measured under conditions same as in Example 1, was a number-averaged molecular weight Mn=27,100 and a weight-averaged molecular weight Mw=47,100.

Also the aforementioned polymer was subjected to a hydrogenolysis in the same manner as in Example 6 to obtain 3.83 g of a polymer. An NMR analysis conducted on the obtained polymer under conditions same as in Example 1 confirmed a polyhydroxyalkanoate copolymer containing units represented by a chemical formula (209) as monomer units. Also a proportion of the monomer units was confirmed as unit C by 10 mol % and unit D by 90 mol %.

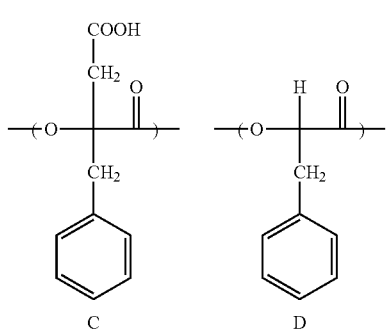

(209)

An average molecular weight of the obtained polyhydroxyalkanoate, measured under conditions same as in Example 1, was a number-averaged molecular weight Mn=23,100 and a weight-averaged molecular weight Mw=24,900.

Example 8

A process was conducted in the same manner as in Example 6 except for employing 14.41 g (130.5 mmol) of ethyl 5-bromovalerate instead of benzyl chloroformate, to obtain 8.02 g of a polymer. An NMR analysis conducted on the obtained polymer under conditions same as in Example 1 confirmed a polyhydroxyalkanoate containing units represented by a chemical formula (210) as monomer units, with a proportion of unit A by 8 mol % and unit B by 92 mol %.

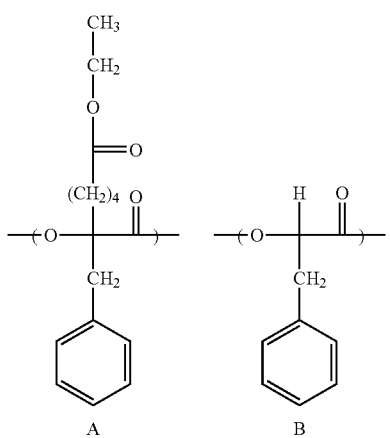

(210)

A    B

An average molecular weight of the obtained polyhydroxyalkanoate, measured under conditions same as in Example 1, was found as a number-averaged molecular weight Mn=28,500 and a weight-averaged molecular weight Mw=39,600.

Also the aforementioned polymer was subjected to a hydrogenolysis in the same manner as in Example 6 to obtain 3.94 g of a polymer. An NMR analysis conducted on the obtained polymer under conditions same as in Example 1 confirmed a polyhydroxyalkanoate copolymer containing units represented by a chemical formula (211) as monomer units. Also a proportion of the monomer units was confirmed as unit C by 8 mol % and unit D by 92 mol %.

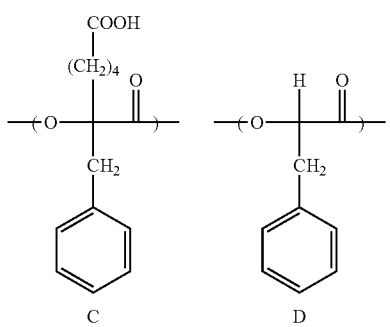

(211)

C    D

An average molecular weight of the obtained polyhydroxyalkanoate, measured under conditions same as in Example 1, was found as a number-averaged molecular weight Mn=24,900 and a weight-averaged molecular weight Mw=35,400.

Example 9

10.00 g of polyhydroxyalkanoate obtained in Example 2 and constituted of a unit represented by the chemical formula (202) were placed in an eggplant-shaped flask, and dissolved by adding 500 ml of THF. The solution was placed under a nitrogen atmosphere and agitated at −78° C. Then 69.38 ml (138.8 mmol) of a 2M THF solution of lithium diisopropylamide were slowly added and the mixture was agitated for 30 minutes at −78° C. Then 23.81 g (277.5 mmol) of benzyl chloroformate were added and the process was thereafter conducted in the same manner as in Example 6 to obtain 9.55 g of polymer. An NMR analysis conducted on the obtained polymer under conditions same as in Example 1 confirmed a polyhydroxyalkanoate containing units represented by the chemical formula (212) as monomer units, with a proportion thereof of unit A by 12 mol % and unit B by 88 mol %.

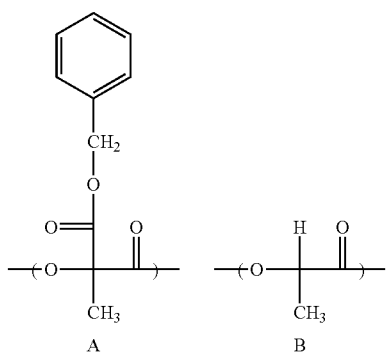

(212)

A    B

An average molecular weight of the obtained polyhydroxyalkanoate, measured in conditions same as in Example 1, was found as a number-averaged molecular weight Mn=32,100 and a weight-averaged molecular weight Mw=46,500.

Also the aforementioned polymer was subjected to a hydrogenolysis in the same manner as in Example 6 to obtain 3.47 g of a polymer. An NMR analysis conducted on the obtained polymer under conditions same as in Example 1 confirmed a polyhydroxyalkanoate copolymer containing units represented by a chemical formula (213) as monomer units. Also a proportion of the monomer units was confirmed as unit C by 12 mol % and unit D by 88 mol %.

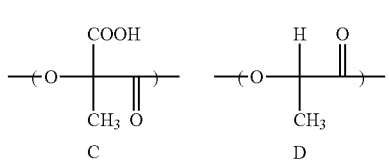

(213)

C    D

An average molecular weight of the obtained polyhydroxyalkanoate, measured under conditions same as in Example 1, was found as a number-averaged molecular weight Mn=30,100 and a weight-averaged molecular weight Mw=45,200.

Example 10

A process was conducted in the same manner as in Example 9 except for employing 31.93 g (277.5 mmol) of benzyl bromoacetate instead of benzyl chloroformate, to obtain 9.17 g of a polymer. An NMR analysis conducted on the obtained polymer under conditions same as in Example 1 confirmed a polyhydroxyalkanoate containing units represented by a chemical formula (214) as monomer units, with a proportion of unit A by 10 mol % and unit B by 90 mol %.

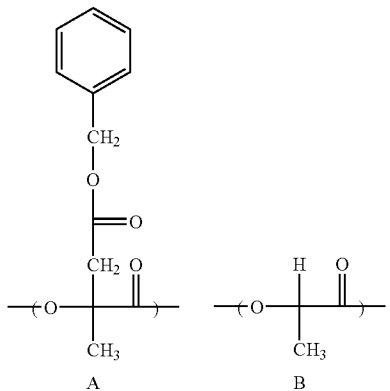

(214)

An average molecular weight of the obtained polyhydroxyalkanoate, measured under conditions same as in Example 1, was found as a number-averaged molecular weight Mn=30,500 and a weight-averaged molecular weight Mw=46,100.

Also the aforementioned polymer was subjected to a hydrogenolysis in the same manner as in Example 6 to obtain 3.68 g of a polymer. An NMR analysis conducted on the obtained polymer under conditions same as in Example 1 confirmed a polyhydroxyalkanoate copolymer containing units represented by a chemical formula (215) as monomer units. Also a proportion of the monomer units was confirmed as unit C by 10 mol % and unit D by 90 mol %.

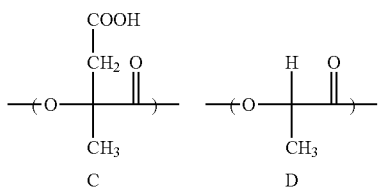

(215)

An average molecular weight of the obtained polyhydroxyalkanoate, measured under conditions same as in Example 1, was found as a number-averaged molecular weight Mn=28,500 and a weight-averaged molecular weight Mw=43,900.

Example 11

A process was conducted in the same manner as in Example 9 except for employing 23.31 g (277.5 mmol) of methyl 3-bromopropionate instead of benzyl chloroformate, to obtain 8.38 g of a polymer. An NMR analysis conducted on the obtained polymer under conditions same as in Example 1 confirmed a polyhydroxyalkanoate containing units represented by a chemical formula (216) as monomer units, with a proportion of unit A by 11 mol % and unit B by 89 mol %.

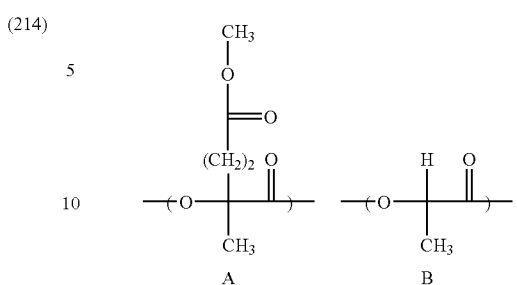

(216)

An average molecular weight of the obtained polyhydroxyalkanoate, measured under conditions same as in Example 1, was found as a number-averaged molecular weight Mn=34,100 and a weight-averaged molecular weight Mw=48,800.

Also the aforementioned polymer was subjected to a hydrogenolysis in the same manner as in Example 6 to obtain 3.89 g of a polymer. An NMR analysis conducted on the obtained polymer under conditions same as in Example 1 confirmed a polyhydroxyalkanoate copolymer containing units represented by a chemical formula (217) as monomer units. Also a proportion of the monomer units was confirmed as unit C by 11 mol % and unit D by 89 mol %.

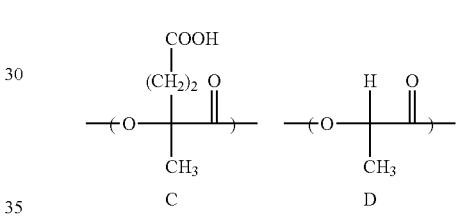

(217)

An average molecular weight of the obtained polyhydroxyalkanoate, measured under conditions same as in Example 1, was found as a number-averaged molecular weight Mn=36,200 and a weight-averaged molecular weight Mw=45,600.

Example 12

A process was conducted in the same manner as in Example 9 except for employing 27.07 g (277.5 mmol) of ethyl 4-bromobutyrate instead of benzyl chloroformate, to obtain 8.69 g of a polymer. An NMR analysis conducted on the obtained polymer under conditions same as in Example 1 confirmed a polyhydroxyalkanoate containing units represented by a chemical formula (218) as monomer units, with a proportion of unit A by 10 mol % and unit B by 90 mol %.

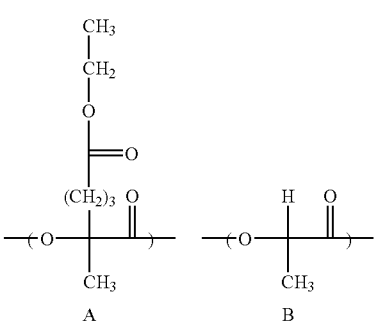

(218)

An average molecular weight of the obtained polyhydroxyalkanoate, measured under conditions same as in Example 1, was found as a number-averaged molecular weight Mn=31,000 and a weight-averaged molecular weight Mw=43,500.

Also the aforementioned polymer was subjected to a hydrogenolysis in the same manner as in Example 6 to obtain 4.01 g of a polymer. An NMR analysis conducted on the obtained polymer under conditions same as in Example 1 confirmed a polyhydroxyalkanoate copolymer containing units represented by a chemical formula (219) as monomer units. Also a proportion of the monomer units was confirmed as unit C by 10 mol % and unit D by 90 mol %.

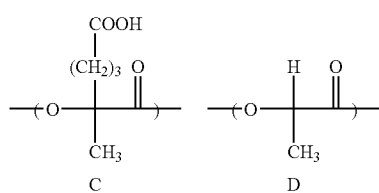

(219)

An average molecular weight of the obtained polyhydroxyalkanoate, measured under conditions same as in Example 1, was found as a number-averaged molecular weight Mn=27,500 and a weight-averaged molecular weight Mw=39,900.

Also 30 mg of the obtained polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 28 mg of polyhydroxyalkanoate.

An NMR analysis on the obtained polyhydroxyalkanoate conducted under conditions same as in Example 1 confirmed that the carboxyl group of the unit C was converted into a methyl carboxylate ester.

Example 13

A process was conducted in the same manner as in Example 9 except for employing 34.85 g (277.5 mmol) of ethyl 8-bromooctanoate instead of benzyl chloroformate, to obtain 8.63 g of a polymer. An NMR analysis conducted on the obtained polymer under conditions same as in Example 1 confirmed a polyhydroxyalkanoate containing units represented by a chemical formula (220) as monomer units, with a proportion of unit A by 7 mol % and unit B by 93 mol %.

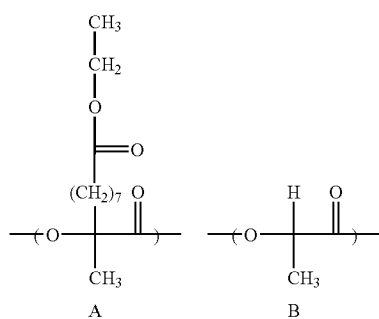

(220)

An average molecular weight of the obtained polyhydroxyalkanoate, measured under conditions same as in Example 1, was found as a number-averaged molecular weight Mn=35,500 and a weight-averaged molecular weight Mw=52,500.

Also the aforementioned polymer was subjected to a hydrogenolysis in the same manner as in Example 6 to obtain 4.10 g of a polymer. An NMR analysis conducted on the obtained polymer under conditions same as in Example 1 confirmed a polyhydroxyalkanoate copolymer containing units represented by a chemical formula (221) as monomer units. Also a proportion of the monomer units was confirmed as unit C by 10 mol % and unit D by 90 mol %.

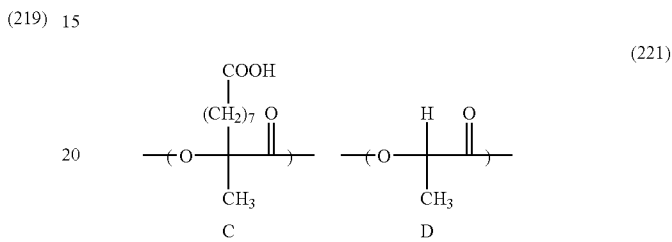

(221)

An average molecular weight of the obtained polyhydroxyalkanoate, measured under conditions same as in Example 1, was found as a number-averaged molecular weight Mn=31,000 and a weight-averaged molecular weight Mw=48,100.

Example 14

10.00 g of polyhydroxyalkanoate obtained in Example 3 and constituted of a unit represented by the chemical formula (203) were placed in an eggplant-shaped flask, and dissolved by adding 500 ml of THF. The solution was placed under a nitrogen atmosphere and agitated at −78° C. Then 58.08 ml (116.2 mmol) of a 2M THF solution of lithium diisopropylamide were slowly added and the mixture was agitated for 30 minutes at −78° C. Then 14.24 g (232.3 mmol) of ethyl chloroacetate were added and the process was thereafter conducted in the same manner as in Example 6 to obtain 8.71 g of polymer. An NMR analysis conducted on the obtained polymer under conditions same as in Example 1 confirmed a polyhydroxyalkanoate containing units represented by the chemical formula (222) as monomer units, with a proportion thereof of unit A by 13 mol % and unit B by 87 mol %.

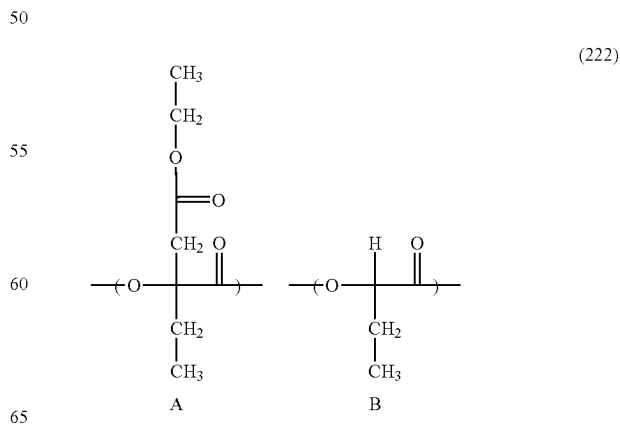

(222)

An average molecular weight of the obtained polyhydroxyalkanoate, measured in conditions same as in Example 1, was found as a number-averaged molecular weight Mn=26,500 and a weight-averaged molecular weight Mw=37,100.

Also the aforementioned polymer was subjected to a hydrogenolysis in the same manner as in Example 6 to obtain 3.68 g of a polymer. An NMR analysis conducted on the obtained polymer under conditions same as in Example 1 confirmed a polyhydroxyalkanoate copolymer containing units represented by a chemical formula (223) as monomer units. Also a proportion of the monomer units was confirmed as unit C by 13 mol % and unit D by 87 mol %.

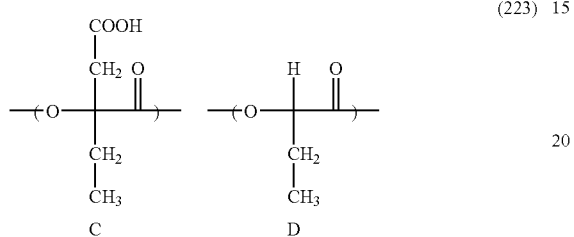

(223)

An average molecular weight of the obtained polyhydroxyalkanoate, measured under conditions same as in Example 1, was found as a number-averaged molecular weight Mn=22,000 and a weight-averaged molecular weight Mw=33,400.

Example 15

A process was conducted in the same manner as in Example 14 except for employing 29.17 g (232.3 mmol) of ethyl 8-bromooctanoate instead of ethyl chloroacetate, to obtain 8.24 g of a polymer. An NMR analysis conducted on the obtained polymer under conditions same as in Example 1 confirmed a polyhydroxyalkanoate containing units represented by a chemical formula (224) as monomer units, with a proportion of unit A by 8 mol % and unit B by 92 mol %.

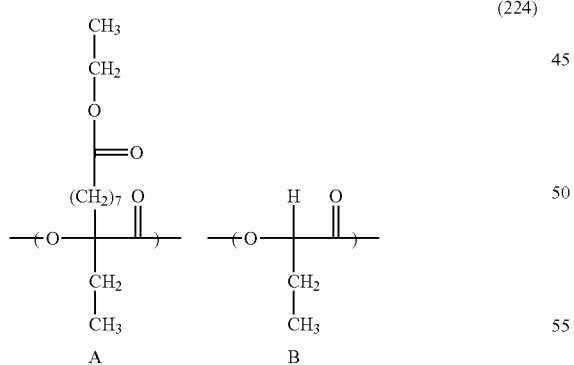

(224)

An average molecular weight of the obtained polyhydroxyalkanoate, measured under conditions same as in Example 1, was found as a number-averaged molecular weight Mn=28,500 and a weight-averaged molecular weight Mw=43,300.

Also the aforementioned polymer was subjected to a hydrogenolysis in the same manner as in Example 6 to obtain 3.91 g of a polymer. An NMR analysis conducted on the obtained polymer under conditions same as in Example 1 confirmed a polyhydroxyalkanoate copolymer containing units represented by a chemical formula (225) as monomer units. Also a proportion of the monomer units was confirmed as unit C by 8 mol % and unit D by 92 mol %.

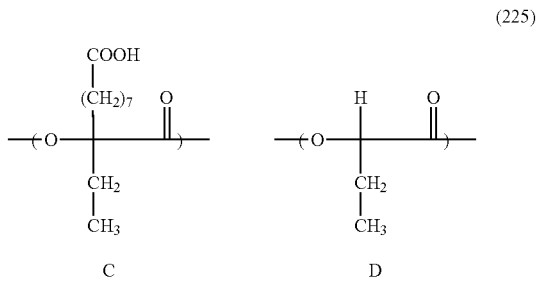

(225)

An average molecular weight of the obtained polyhydroxyalkanoate, measured under conditions same as in Example 1, was found as a number-averaged molecular weight Mn=23,500 and a weight-averaged molecular weight Mw=36,400.

Example 16

10.00 g of polyhydroxyalkanoate obtained in Example 4 and constituted of a unit represented by the chemical formula (204) were placed in an eggplant-shaped flask, and dissolved by adding 500 ml of THF. The solution was placed under a nitrogen atmosphere and agitated at −78° C. Then 43.81 ml (87.6 mmol) of a 2M THF solution of lithium diisopropylamide were slowly added and the mixture was agitated for 30 minutes at −78° C. Then 15.03 g (175.2 mmol) of benzyl chloroformate were added and the process was thereafter conducted in the same manner as in Example 6 to obtain 8.11 g of polymer. An NMR analysis conducted on the obtained polymer under conditions same as in Example 1 confirmed a polyhydroxyalkanoate containing units represented by the chemical formula (226) as monomer units, with a proportion thereof of unit A by 12 mol % and unit B by 88 mol %.

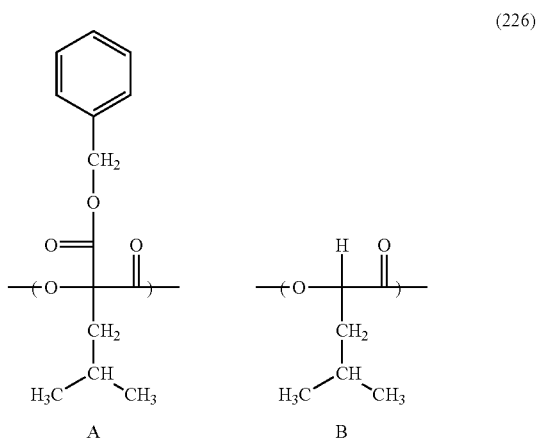

(226)

An average molecular weight of the obtained polyhydroxyalkanoate, measured in conditions same as in Example 1, was found as a number-averaged molecular weight Mn=28,700 and a weight-averaged molecular weight Mw=45,300.

Also the aforementioned polymer was subjected to a hydrogenolysis in the same manner as in Example 6 to obtain 3.71 g of a polymer. An NMR analysis conducted on the obtained polymer under conditions same as in Example 1 confirmed a polyhydroxyalkanoate copolymer containing units represented by a chemical formula (227) as monomer units. Also a proportion of the monomer units was confirmed as unit C by 12 mol % and unit D by 88 mol %.

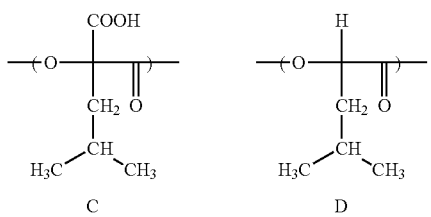

(227)

An average molecular weight of the obtained polyhydroxyalkanoate, measured under conditions same as in Example 1, was found as a number-averaged molecular weight Mn=24,300 and a weight-averaged molecular weight Mw=37,500.

Example 17

A process was conducted in the same manner as in Example 16 except for employing 18.32 g (175.2 mmol) of ethyl 5-bromovalerate instead of benzyl chloroformate, to obtain 7.64 g of a polymer. An NMR analysis conducted on the obtained polymer under conditions same as in Example 1 confirmed a polyhydroxyalkanoate containing units represented by a chemical formula (228) as monomer units, with a proportion of unit A by 8 mol % and unit B by 92 mol %.

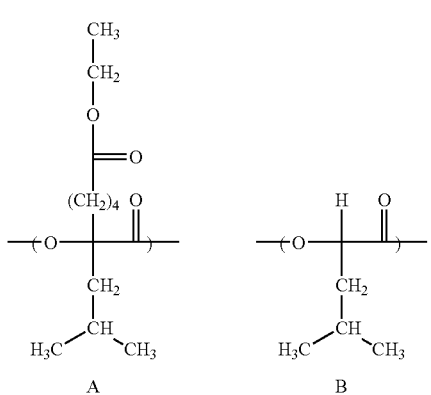

(228)

An average molecular weight of the obtained polyhydroxyalkanoate, measured under conditions same as in Example 1, was found as a number-averaged molecular weight Mn=26,500 and a weight-averaged molecular weight Mw=41,100.

Also the aforementioned polymer was subjected to a hydrogenolysis in the same manner as in Example 6 to obtain 4.05 g of a polymer. An NMR analysis conducted on the obtained polymer under conditions same as in Example 1 confirmed a polyhydroxyalkanoate copolymer containing units represented by a chemical formula (229) as monomer units. Also a proportion of the monomer units was confirmed as unit C by 11 mol % and unit D by 89 mol %.

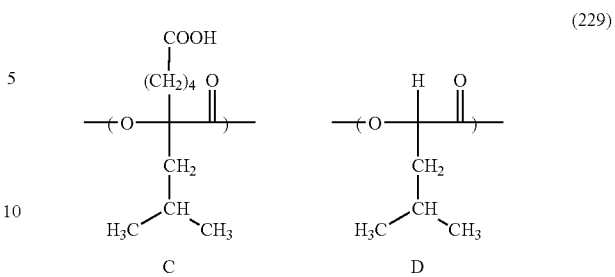

(229)

An average molecular weight of the obtained polyhydroxyalkanoate, measured under conditions same as in Example 1, was found as a number-averaged molecular weight Mn=22,200 and a weight-averaged molecular weight Mw=33,700.

Example 18

10.00 g of polyhydroxyalkanoate obtained in Example 5 and constituted of a unit represented by the chemical formula (205) were placed in an eggplant-shaped flask, and dissolved by adding 500 ml of THF. The solution was placed under a nitrogen atmosphere and agitated at −78° C. Then 39.01 ml (78.0 mmol) of a 2M THF solution of lithium diisopropylamide were slowly added and the mixture was agitated for 30 minutes at −78° C. Then 17.95 g (156.0 mmol) of benzyl bromoacetate were added and the process was thereafter conducted in the same manner as in Example 6 to obtain 8.40 g of polymer. An NMR analysis conducted on the obtained polymer under conditions same as in Example 1 confirmed a polyhydroxyalkanoate containing units represented by the chemical formula (230) as monomer units, with a proportion thereof of unit A by 9 mol % and unit B by 91 mol %.

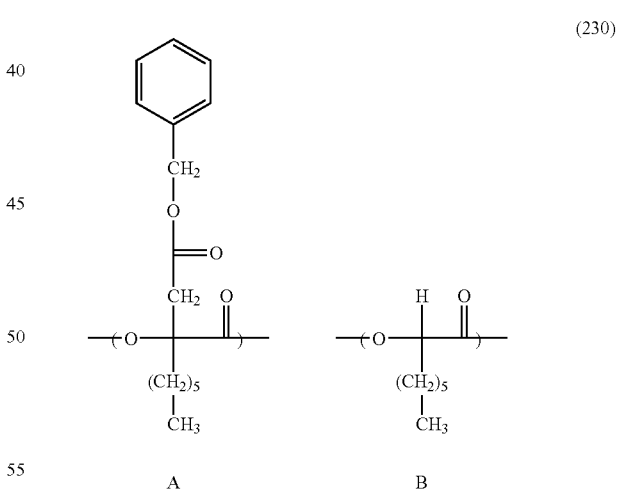

(230)

An average molecular weight of the obtained polyhydroxyalkanoate, measured in conditions same as in Example 1, was found as a number-averaged molecular weight Mn=23,000 and a weight-averaged molecular weight Mw=34,500.

Also the aforementioned polymer was subjected to a hydrogenolysis in the same manner as in Example 6 to obtain 3.68 g of a polymer. An NMR analysis conducted on the obtained polymer under conditions same as in Example 1 confirmed a polyhydroxyalkanoate copolymer containing units represented by a chemical formula (231) as monomer units. Also a proportion of the monomer units was confirmed as unit C by 9 mol % and unit D by 91 mol %.

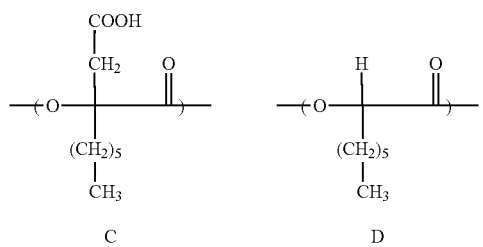

(231)

An average molecular weight of the obtained polyhydroxyalkanoate, measured under conditions same as in Example 1, was found as a number-averaged molecular weight Mn=19,800 and a weight-averaged molecular weight Mw=30,900.

Example 19

A process was conducted in the same manner as in Example 18 except for employing 17.56 g (156.0 mmol) of ethyl 6-bromohexanoate instead of benzyl bromoacetate, to obtain 7.52 g of a polymer. An NMR analysis conducted on the obtained polymer under conditions same as in Example 1 confirmed a polyhydroxyalkanoate containing units represented by a chemical formula (232) as monomer units, with a proportion of unit A by 8 mol % and unit B by 92 mol %.

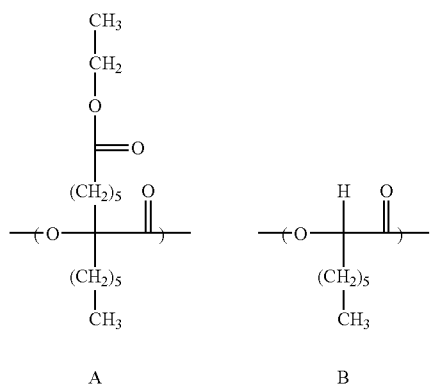

(232)

An average molecular weight of the obtained polyhydroxyalkanoate, measured under conditions same as in Example 1, was found as a number-averaged molecular weight Mn=22,500 and a weight-averaged molecular weight Mw=32,200.

Also the aforementioned polymer was subjected to a hydrogenolysis in the same manner as in Example 6 to obtain 4.05 g of a polymer. An NMR analysis conducted on the obtained polymer under conditions same as in Example 1 confirmed a polyhydroxyalkanoate copolymer containing units represented by a chemical formula (233) as monomer units. Also a proportion of the monomer units was confirmed as unit C by 11 mol % and unit D by 89 mol %.

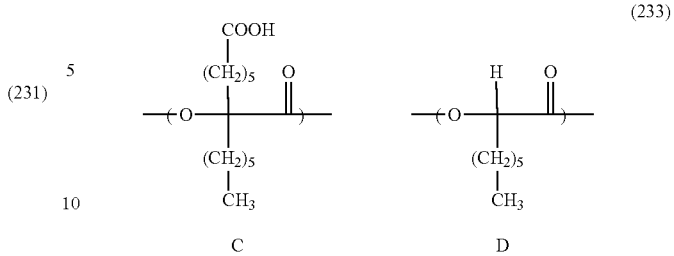

(233)

An average molecular weight of the obtained polyhydroxyalkanoate, measured under conditions same as in Example 1, was found as a number-averaged molecular weight Mn=20,100 and a weight-averaged molecular weight Mw=30,200.

Example 20

In a nitrogen atmosphere, 0.40 g of polyhydroxyalkanoate copolymer (C: 11 mol %, D: 89 mol %) obtained in Example 6 and constituted of a unit represented by the chemical formula (207) and 0.25 g (1.4 mmol) of 2-aminobenzenesulfonic acid were placed in a 100-ml three-necked flask, agitated with 15.0 ml of pyridine, further added with 0.75 ml (2.8 mmol) of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.35 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak resulting from an aromatic ring of the 2-aminobenzenesulfonic acid structure, that the polymer was a polyhydroxyalkanoate containing units represented by a chemical formula (234) as monomer units.

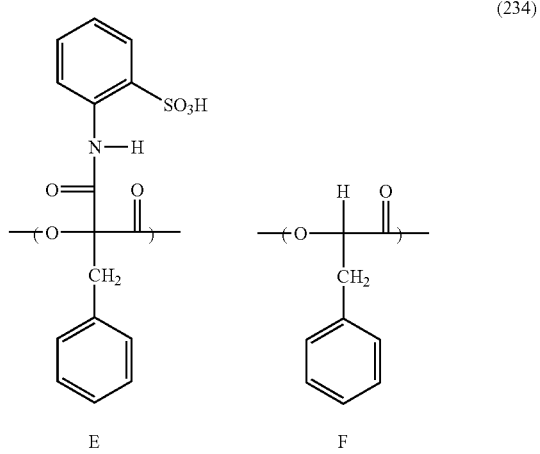

(234)

It was also confirmed that polyhydroxyalkanoate represented by the chemical formula (234) was a copolymer containing the unit E by 11 mol %. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=20,500 and a weight-averaged molecular weight Mw=30,800.

Example 21

A process was conducted in the same manner as in Example 20 except for employing 0.29 g (1.4 mmol) of 4-methoxyaniline-2-sulfonic acid instead of 2-aminobenzenesulfonic acid in Example 20, to obtain 0.34 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (235) as monomer units, containing unit E by 11 mol %.

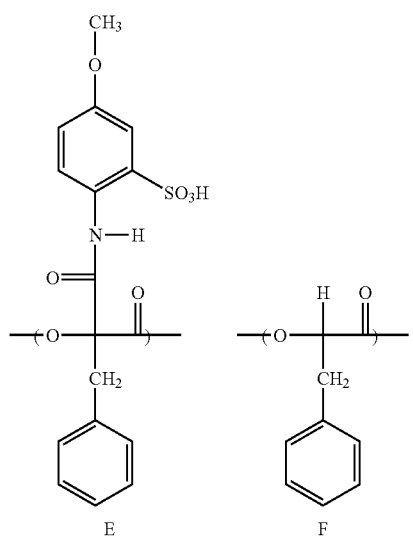

(235)

Also an average molecular weight of the obtained polyhydroxyalkanoate, measured under conditions same as in Example 20, was found as a number-averaged molecular weight Mn=19,800 and a weight-averaged molecular weight Mw=30,100.

Example 22

A process was conducted in the same manner as in Example 20 except for employing 0.32 g (1.4 mmol) of 2-amino-1-naphthalenesulfonic acid instead of 2-aminobenzenesulfonic acid in Example 20, to obtain 0.37 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (236) as monomer units, containing unit E by 8 mol %.

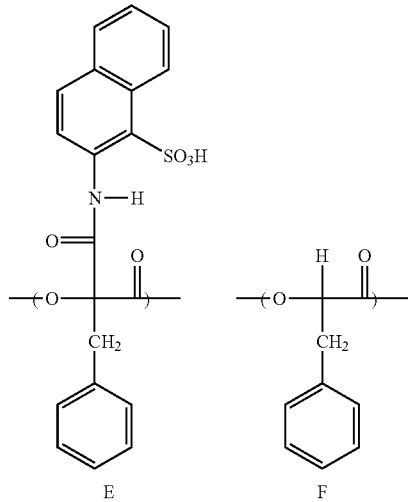

(236)

Also an average molecular weight of the obtained polyhydroxyalkanoate, measured under conditions same as in Example 20, was found as a number-averaged molecular weight Mn=17,000 and a weight-averaged molecular weight Mw=26,900.

Example 23

In a nitrogen atmosphere, 0.40 g of polyhydroxyalkanoate copolymer (C: 10 mol %, D: 90 mol %) obtained in Example 7 and constituted of a unit represented by the chemical formula (209) and 0.26 g (1.3 mmol) of 4-aminobenzenesulfonic acid were placed in a 100-ml three-necked flask, agitated with 15.0 ml of pyridine, further added with 0.68 ml (2.6 mmol) of triphenyl phosphite, and the process was thereafter conducted in the same manner as in Example 20 to obtain 0.34 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (237) as monomer units, containing unit E by 10 mol %.

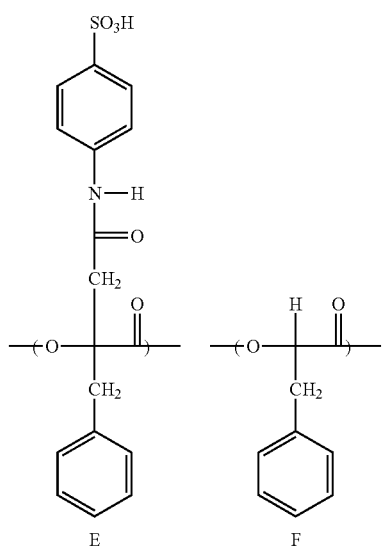

(237)

Also an average molecular weight of the obtained polyhydroxyalkanoate, measured under conditions same as in Example 20, was found as a number-averaged molecular weight Mn=19,900 and a weight-averaged molecular weight Mw=29,900.

Example 24

A process was conducted in the same manner as in Example 23 except for employing 0.20 g (1.3 mmol) of 2-amino-2-methylpropanesulfonic acid instead of 4-aminobenzenesulfonic acid in Example 23, to obtain 0.33 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (238) as monomer units, containing unit E by 8 mol %.

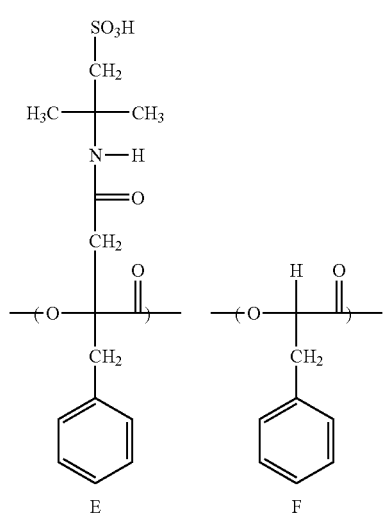

(238)

Also an average molecular weight of the obtained polyhydroxyalkanoate, measured under conditions same as in Example 20, was found as a number-averaged molecular weight Mn=18,900 and a weight-averaged molecular weight Mw=28,900.

Example 25

A process was conducted in the same manner as in Example 23 except for employing 0.29 g (1.3 mmol) of 1-naphthylamine-8-sulfonic acid instead of 4-aminobenzenesulfonic acid in Example 23, to obtain 0.35 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (239) as monomer units, containing unit E by 10 mol %.

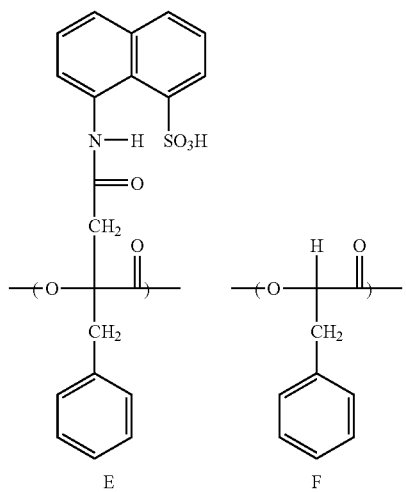

(239)

Also an average molecular weight of the obtained polyhydroxyalkanoate, measured under conditions same as in Example 20, was found as a number-averaged molecular weight Mn=20,500 and a weight-averaged molecular weight Mw=30,200.

Example 26

A process was conducted in the same manner as in Example 23 except for employing 0.32 g (1.3 mmol) of 2-aminobenzenesulfonic acid phenyl ester instead of 4-aminobenzenesulfonic acid in Example 23, to obtain 0.37 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (240) as monomer units, containing unit E by 10 mol %.

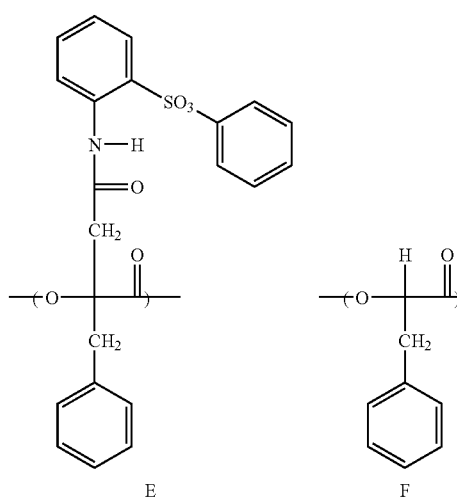

(240)

Also an average molecular weight of the obtained polyhydroxyalkanoate, measured under conditions same as in Example 20, was found as a number-averaged molecular weight Mn=20,900 and a weight-averaged molecular weight Mw=33,000.

Example 27

In a nitrogen atmosphere, 0.40 g of polyhydroxyalkanoate copolymer (C: 8 mol %, D: 92 mol %) obtained in Example 8 and constituted of a unit represented by the chemical formula (211) and 0.18 g (1.0 mmol) of 2-aminobenzenesulfonic acid were placed in a 100-ml three-necked flask, agitated with 15.0 ml of pyridine, further added with 0.53 ml (2.0 mmol) of triphenyl phosphite, and the process was thereafter conducted in the same manner as in Example 20 to obtain 0.33 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (241) as monomer units, containing unit E by 8 mol %.

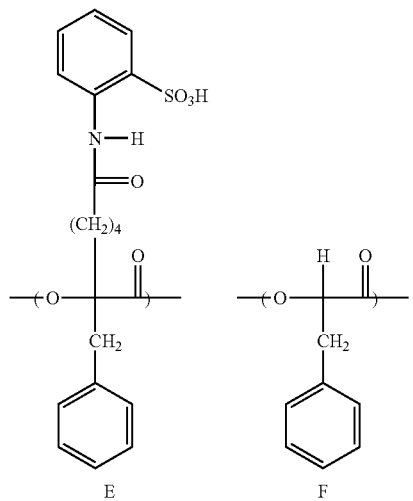

(241)

Also an average molecular weight of the obtained polyhydroxyalkanoate, measured under conditions same as in Example 20, was found as a number-averaged molecular weight Mn=20,200 and a weight-averaged molecular weight Mw=31,900.

Example 28

A process was conducted in the same manner as in Example 27 except for employing 0.13 g (1.0 mmol) of taurine instead of 2-aminobenzenesulfonic acid in Example 27, to obtain 0.31 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (242) as monomer units, containing unit E by 6 mol %.

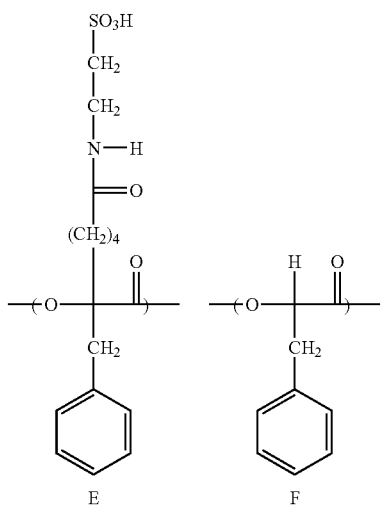

(242)

Also an average molecular weight of the obtained polyhydroxyalkanoate, measured under conditions same as in Example 20, was found as a number-averaged molecular weight Mn=19,800 and a weight-averaged molecular weight Mw=31,700.

Example 29

A process was conducted in the same manner as in Example 27 except for employing 0.23 g (1.0 mmol) of 2-amino-1-naphthalenesulfonic acid instead of 2-aminobenzenesulfonic acid in Example 27, to obtain 0.31 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (243) as monomer units, containing unit E by 8 mol %.

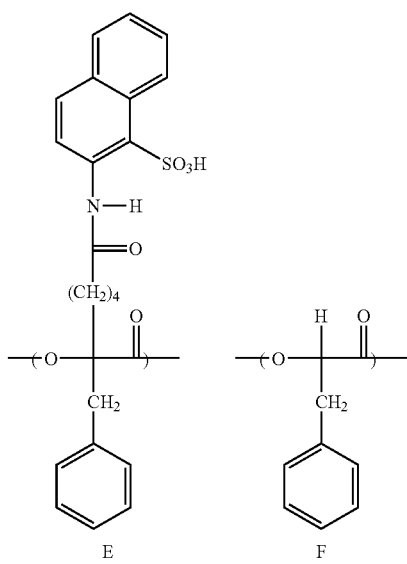

(243)

Also an average molecular weight of the obtained polyhydroxyalkanoate, measured under conditions same as in Example 20, was found as a number-averaged molecular weight Mn=17,800 and a weight-averaged molecular weight Mw=28,800.

Example 30

In a nitrogen atmosphere, 0.40 g of polyhydroxyalkanoate copolymer (C: 12 mol %, D: 88 mol %) obtained in Example 9 and constituted of a unit represented by the chemical formula (213) and 0.54 g (3.1 mmol) of 2-aminobenzenesulfonic acid were placed in a 100-ml three-necked flask, agitated with 15.0 ml of pyridine, further added with 1.62 ml (6.2 mmol) of triphenyl phosphite, and the process was thereafter conducted in the same manner as in Example 20 to obtain 0.38 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (244) as monomer units, containing unit E by 11 mol %.

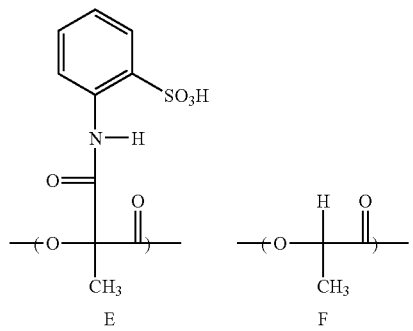

(244)

E          F

Also an average molecular weight of the obtained polyhydroxyalkanoate, measured under conditions same as in Example 20, was found as a number-averaged molecular weight Mn=26,500 and a weight-averaged molecular weight Mw=42,400.

Example 31

A process was conducted in the same manner as in Example 30 except for employing 0.63 g (3.1 mmol) of 4-methoxyaniline-2-sulfonic acid instead of 2-aminobenzenesulfonic acid in Example 30, to obtain 0.31 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (245) as monomer units, containing unit E by 11 mol %.

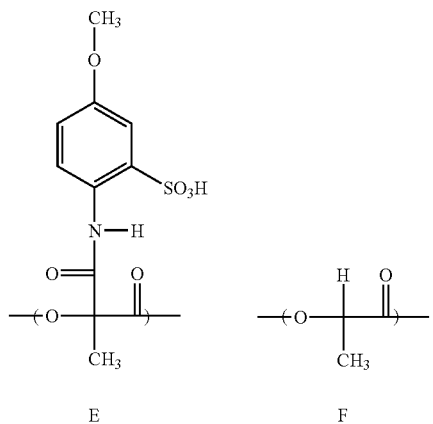

(245)

E          F

Also an average molecular weight of the obtained polyhydroxyalkanoate, measured under conditions same as in Example 20, was found as a number-averaged molecular weight Mn=26,100 and a weight-averaged molecular weight Mw=41,200.

Example 32

A process was conducted in the same manner as in Example 30 except for employing 0.69 g (3.1 mmol) of 2-amino-1-naphthalenesulfonic acid instead of 2-aminobenzenesulfonic acid in Example 30, to obtain 0.37 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (246) as monomer units, containing unit E by 8 mol %.

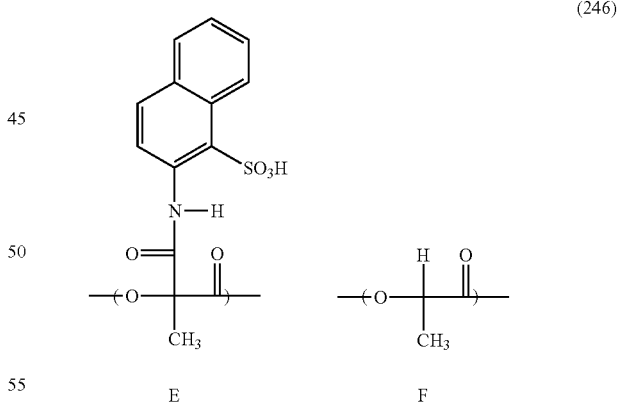

(246)

E          F

Also an average molecular weight of the obtained polyhydroxyalkanoate, measured under conditions same as in Example 20, was found as a number-averaged molecular weight Mn=27,200 and a weight-averaged molecular weight Mw=43,000.

Example 33

In a nitrogen atmosphere, 0.40 g of polyhydroxyalkanoate copolymer (C: 10 mol %, D: 90 mol %) obtained in Example 10 and constituted of a unit represented by the chemical formula (215) and 0.44 g (2.6 mmol) of 2-aminobenzenesulfonic acid were placed in a 100-ml three-necked flask, agitated with 15.0 ml of pyridine, further added with 1.34 ml (5.1 mmol) of triphenyl phosphite, and the process was thereafter conducted in the same manner as in Example 20 to obtain 0.38 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (247) as monomer units, containing unit E by 10 mol %.

(247)

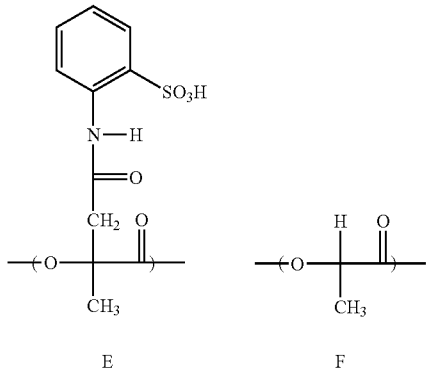

Also an average molecular weight of the obtained polyhydroxyalkanoate, measured under conditions same as in Example 20, was found as a number-averaged molecular weight Mn=24,300 and a weight-averaged molecular weight Mw=39,600.

Example 34

A process was conducted in the same manner as in Example 33 except for employing 0.44 g (2.6 mmol) of 3-aminobenzenesulfonic acid instead of 2-aminobenzenesulfonic acid in Example 33, to obtain 0.36 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (248) as monomer units, containing unit E by 9 mol %.

(248)

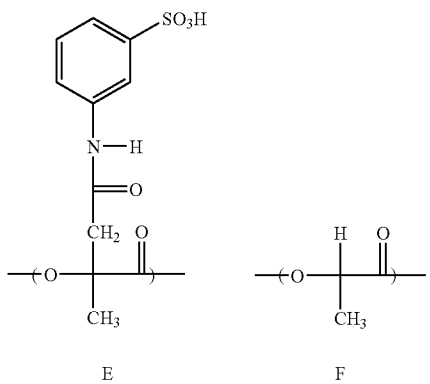

Also an average molecular weight of the obtained polyhydroxyalkanoate, measured under conditions same as in Example 20, was found as a number-averaged molecular weight Mn=23,000 and a weight-averaged molecular weight Mw=37,300.

Example 35

A process was conducted in the same manner as in Example 33 except for employing 0.44 g (2.6 mmol) of 4-aminobenzenesulfonic acid instead of 2-aminobenzenesulfonic acid in Example 33, to obtain 0.38 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (249) as monomer units, containing unit E by 10 mol %.

(249)

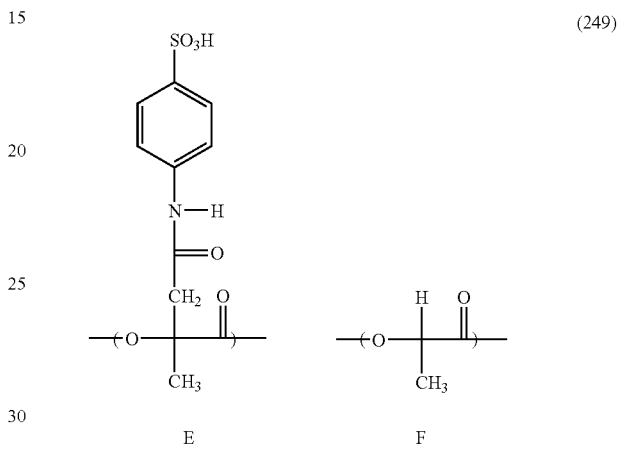

Also an average molecular weight of the obtained polyhydroxyalkanoate, measured under conditions same as in Example 20, was found as a number-averaged molecular weight Mn=24,500 and a weight-averaged molecular weight Mw=37,800.

Example 36

A process was conducted in the same manner as in Example 33 except for employing 0.52 g (2.6 mmol) of 4-methoxyaniline-2-sulfonic acid instead of 2-aminobenzenesulfonic acid in Example 33, to obtain 0.40 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (250) as monomer units, containing unit E by 10 mol %.

(250)

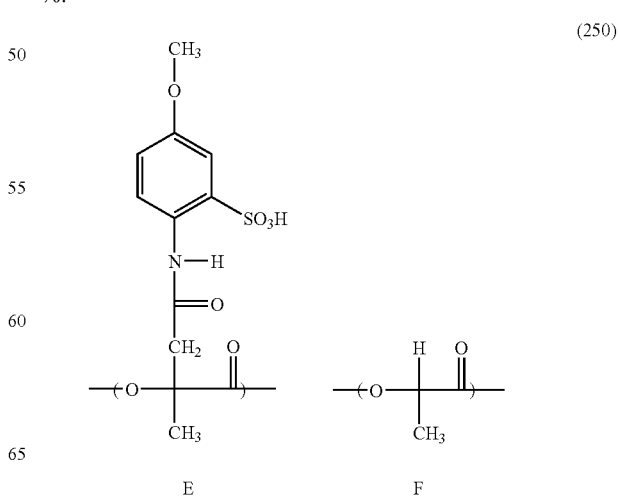

Example 37

A process was conducted in the same manner as in Example 33 except for employing 0.39 g (2.6 mmol) of 2-amino-2-methylpropanesulfonic acid instead of 2-aminobenzenesulfonic acid in Example 33, to obtain 0.33 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (251) as monomer units, containing unit E by 7 mol %.

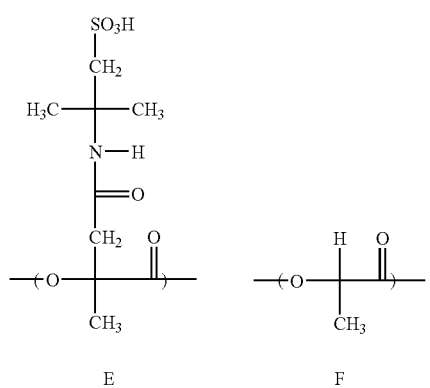

(251)

Also an average molecular weight of the obtained polyhydroxyalkanoate, measured under conditions same as in Example 20, was found as a number-averaged molecular weight Mn=20,200 and a weight-averaged molecular weight Mw=34,100.

Example 38

In a nitrogen atmosphere, 0.40 g of polyhydroxyalkanoate copolymer (C: 11 mol %, D: 89 mol %) obtained in Example 11 and constituted of a unit represented by the chemical formula (217) and 0.48 g (2.7 mmol) of 2-aminobenzenesulfonic acid were placed in a 100-ml three-necked flask, agitated with 15.0 ml of pyridine, further added with 1.43 ml (5.4 mmol) of triphenyl phosphite, and the process was thereafter conducted in the same manner as in Example 20 to obtain 0.37 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (252) as monomer units, containing unit E by 11 mol %.

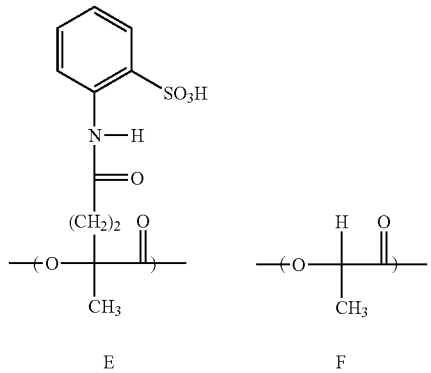

(252)

Also an average molecular weight of the obtained polyhydroxyalkanoate, measured under conditions same as in Example 20, was found as a number-averaged molecular weight Mn=26,900 and a weight-averaged molecular weight Mw=40,400.

Example 39

A process was conducted in the same manner as in Example 38 except for employing 0.61 g (2.7 mmol) of 2-amino-1-naphthalenesulfonic acid instead of 2-aminobenzenesulfonic acid in Example 38, to obtain 0.41 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (253) as monomer units, containing unit E by 11 mol %.

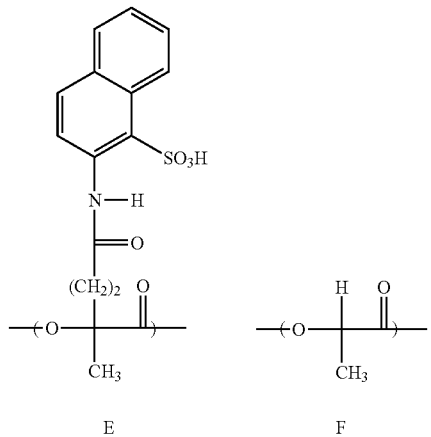

(253)

Also an average molecular weight of the obtained polyhydroxyalkanoate, measured under conditions same as in Example 20, was found as a number-averaged molecular weight Mn=26,500 and a weight-averaged molecular weight Mw=42,900.

Example 40

In a nitrogen atmosphere, 0.40 g of polyhydroxyalkanoate copolymer (C: 7 mol %, D: 93 mol %) obtained in Example 13 and constituted of a unit represented by the chemical formula (221) and 0.30 g (1.7 mmol) of 2-aminobenzenesulfonic acid were placed in a 100-ml three-necked flask, agitated with 15.0 ml of pyridine, further added with 0.89 ml (3.4 mmol) of triphenyl phosphite, and the process was thereafter conducted in the same manner as in Example 20 to obtain 0.36 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (254) as monomer units, containing unit E by 7 mol %.

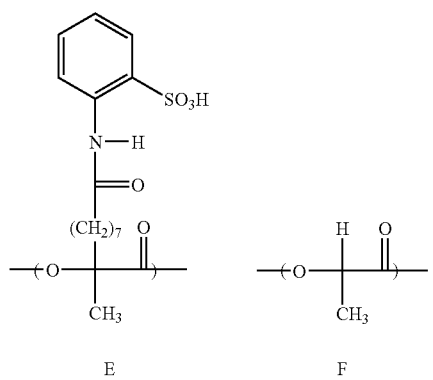

(254)

Also an average molecular weight of the obtained polyhydroxyalkanoate, measured under conditions same as in Example 20, was found as a number-averaged molecular weight Mn=27,800 and a weight-averaged molecular weight Mw=43,900.

Example 41

A process was conducted in the same manner as in Example 40 except for employing 0.43 g (1.7 mmol) of 2-aminobenzenesulfonic acid phenyl ester instead of 2-aminobenzenesulfonic acid in Example 40, to obtain 0.39 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (280) as monomer units, containing unit E by 7 mol %.

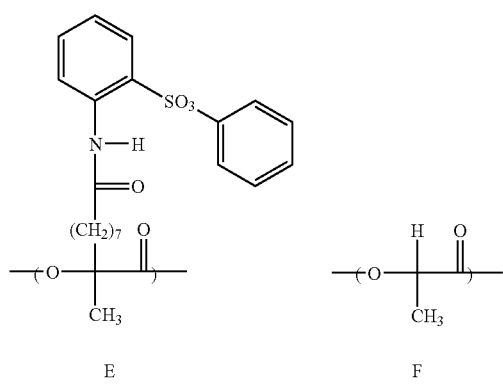

(280)

Also an average molecular weight of the obtained polyhydroxyalkanoate, measured under conditions same as in Example 20, was found as a number-averaged molecular weight Mn=27,500 and a weight-averaged molecular weight Mw=44,600.

Example 42

In a nitrogen atmosphere, 0.40 g of polyhydroxyalkanoate copolymer (C: 13 mol %, D: 87 mol %) obtained in Example 14 and constituted of a unit represented by the chemical formula (223) and 0.48 g (2.8 mmol) of 2-aminobenzenesulfonic acid were placed in a 100-ml three-necked flask, agitated with 15.0 ml of pyridine, further added with 1.45 ml (5.6 mmol) of triphenyl phosphite, and the process was thereafter conducted in the same manner as in Example 20 to obtain 0.38 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (255) as monomer units, containing unit E by 12 mol %.

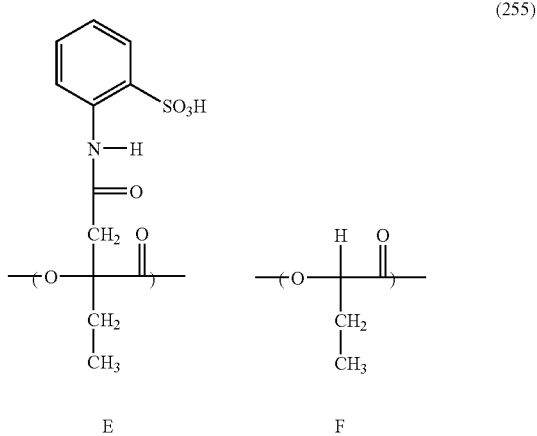

(255)

Also an average molecular weight of the obtained polyhydroxyalkanoate, measured under conditions same as in Example 20, was found as a number-averaged molecular weight Mn=18,900 and a weight-averaged molecular weight Mw=28,400.

Example 43

A process was conducted in the same manner as in Example 42 except for employing 0.42 g (2.8 mmol) of 4-methoxyaniline-2-sulfonic acid instead of 2-aminobenzenesulfonic acid in Example 42, to obtain 0.42 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (256) as monomer units, containing unit E by 12 mol %.

(256)

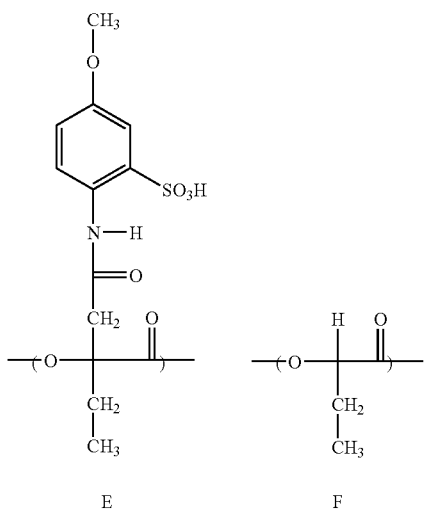

Also an average molecular weight of the obtained polyhydroxyalkanoate, measured under conditions same as in Example 20, was found as a number-averaged molecular weight Mn=18,600 and a weight-averaged molecular weight Mw=28,500.

Example 44

A process was conducted in the same manner as in Example 42 except for employing 0.62 g (2.8 mmol) of 2-amino-1-naphthalenesulfonic acid instead of 2-aminobenzenesulfonic acid in Example 42, to obtain 0.41 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (257) as monomer units, containing unit E by 11 mol %.

(257)

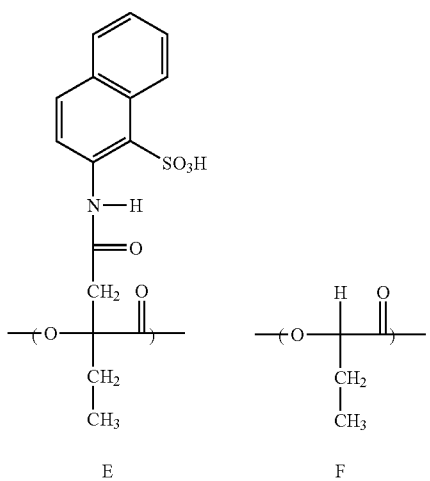

Also an average molecular weight of the obtained polyhydroxyalkanoate, measured under conditions same as in Example 20, was found as a number-averaged molecular weight Mn=18,000 and a weight-averaged molecular weight Mw=28,400.

Example 45

A process was conducted in the same manner as in Example 42 except for employing 0.41 g (2.8 mmol) of 2-amino-2-methylpropanesulfonic acid instead of 2-aminobenzenesulfonic acid in Example 42, to obtain 0.40 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (258) as monomer units, containing unit E by 9 mol %.

(258)

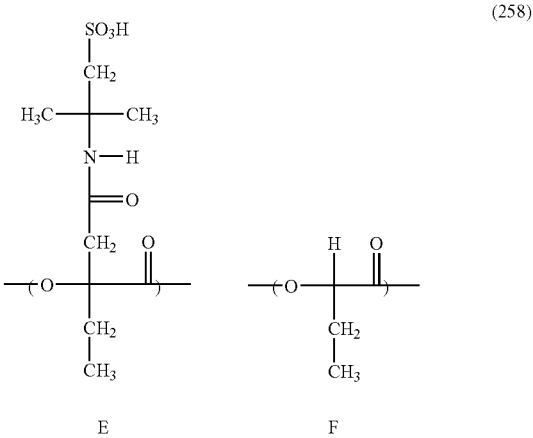

Also an average molecular weight of the obtained polyhydroxyalkanoate, measured under conditions same as in Example 20, was found as a number-averaged molecular weight Mn=18,700 and a weight-averaged molecular weight Mw=29,900.

Example 46

In a nitrogen atmosphere, 0.40 g of polyhydroxyalkanoate copolymer (C: 8 mol %, D: 92 mol %) obtained in Example 15 and constituted of a unit represented by the chemical formula (225) and 0.28 g (1.6 mmol) of 2-aminobenzenesulfonic acid were placed in a 100-ml three-necked flask, agitated with 15.0 ml of pyridine, further added with 0.85 ml (3.3 mmol) of triphenyl phosphite, and the process was thereafter conducted in the same manner as in Example 20 to obtain 0.36 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (259) as monomer units, containing unit E by 8 mol %.

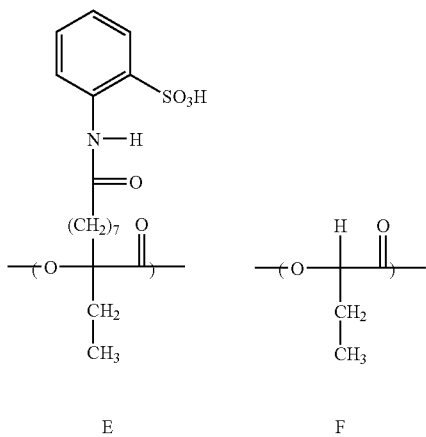

(259)

Also an average molecular weight of the obtained polyhydroxyalkanoate, measured under conditions same as in Example 20, was found as a number-averaged molecular weight Mn=20,500 and a weight-averaged molecular weight Mw=33,600.

Example 47

A process was conducted in the same manner as in Example 46 except for employing 0.41 g (2.8 mmol) of 4-aminobenzenesulfonic acid phenyl ester instead of 2-aminobenzenesulfonic acid in Example 46, to obtain 0.35 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (260) as monomer units, containing unit E by 7 mol %.

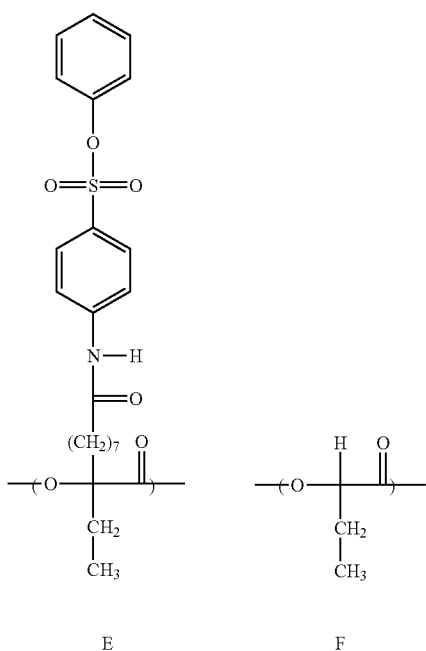

(260)

Also an average molecular weight of the obtained polyhydroxyalkanoate, measured under conditions same as in Example 20, was found as a number-averaged molecular weight Mn=21,000 and a weight-averaged molecular weight Mw=32,600.

Example 48

In a nitrogen atmosphere, 0.40 g of polyhydroxyalkanoate copolymer (C: 11 mol %, D: 89 mol %) obtained in Example 17 and constituted of a unit represented by the chemical formula (229) and 0.39 g (1.8 mmol) of 2-amino-1-naphthalenesulfonic acid were placed in a 100-ml three-necked flask, agitated with 15.0 ml of pyridine, further added with 0.92 ml (3.5 mmol) of triphenyl phosphite, and the process was thereafter conducted in the same manner as in Example 20 to obtain 0.37 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (261) as monomer units, containing unit E by 11 mol %.

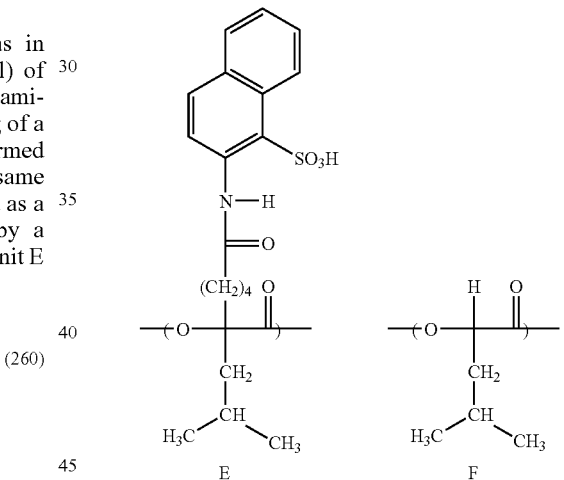

(261)

Also an average molecular weight of the obtained polyhydroxyalkanoate, measured under conditions same as in Example 20, was found as a number-averaged molecular weight Mn=19,800 and a weight-averaged molecular weight Mw=33,100.

Example 49

A process was conducted in the same manner as in Example 48 except for employing 0.27 g (1.8 mmol) of 2-amino-2-methylpropanesulfonic acid instead of 2-amino-1-naphthalenesulfonic acid in Example 48, to obtain 0.33 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (262) as monomer units, containing unit E by 9 mol %.

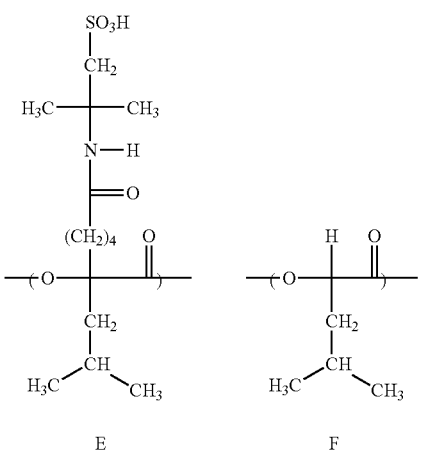

(262)

Also an average molecular weight of the obtained polyhydroxyalkanoate, measured under conditions same as in Example 20, was found as a number-averaged molecular weight Mn=20,900 and a weight-averaged molecular weight Mw=35,500.

Example 50

In a nitrogen atmosphere, 0.40 g of polyhydroxyalkanoate copolymer (C: 9 mol %, D: 91 mol %) obtained in Example 18 and constituted of a unit represented by the chemical formula (231) and 0.23 g (1.3 mmol) of 2-aminobenzenesulfonic acid were placed in a 100-ml three-necked flask, agitated with 15.0 ml of pyridine, further added with 0.70 ml (2.7 mmol) of triphenyl phosphite, and the process was thereafter conducted in the same manner as in Example 20 to obtain 0.35 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (263) as monomer units, containing unit E by 8 mol %.

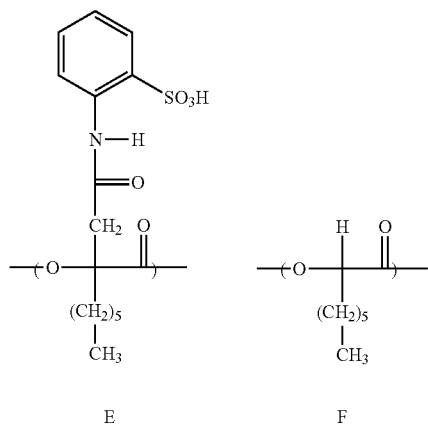

(263)

Also an average molecular weight of the obtained polyhydroxyalkanoate, measured under conditions same as in Example 20, was found as a number-averaged molecular weight Mn=18,900 and a weight-averaged molecular weight Mw=30,400.

Example 51

A process was conducted in the same manner as in Example 50 except for employing 0.27 g (1.3 mmol) of 4-methoxyaniline-2-sulfonic acid instead of 2-aminobenzenesulfonic acid in Example 50, to obtain 0.37 g of a polymer. In an NMR analysis and a Fourier transformed infrared absorption (FT-IR) spectrum under conditions same as in Example 20, the obtained polymer was confirmed as a polyhydroxyalkanoate containing units represented by a chemical formula (264) as monomer units, containing unit E by 8 mol %.

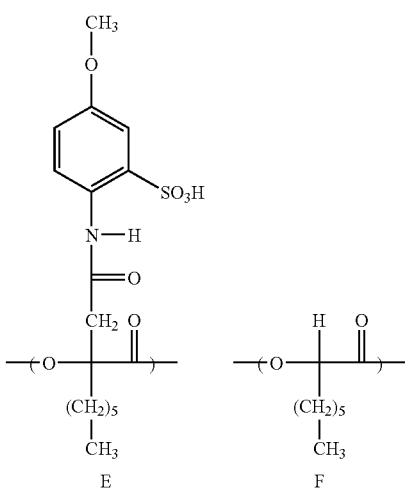

(264)

Also an average molecular weight of the obtained polyhydroxyalkanoate, measured under conditions same as in Example 20, was found as a number-averaged molecular weight Mn=19,000 and a weight-averaged molecular weight Mw=30,000.

Example 52

0.30 g of polyhydroxyalkanoate copolymer obtained in Example 20 and constituted of a unit represented by the chemical formula (234) were placed in an eggplant-shaped flask, dissolved by adding 21.0 ml of chloroform and 7.0 ml of methanol, and cooled to 0° C. Then 0.78 ml of a 2 mol/L hexane solution of trimethylsilyl diazomethane (manufactured by Aldrich Inc.) were added and the mixture was agitated for 4 hours. After the reaction, the solvent was distilled off in an evaporator to recover a polymer. The polymer was re-dissolved by adding 21.0 ml of chloroform and 7.0 ml of methanol, and the solvent was distilled off in an evaporator. This process was repeated three times. The recovered polymer was dried under a reduced pressure to obtain 0.30 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature). A result of $^1$H-NMR confirmed, based on a peak attributable to methyl sulfonate at 3-4 ppm, that the polymer was a polyhydroxyalkanoate containing units represented by a chemical formula (265) as monomer units.

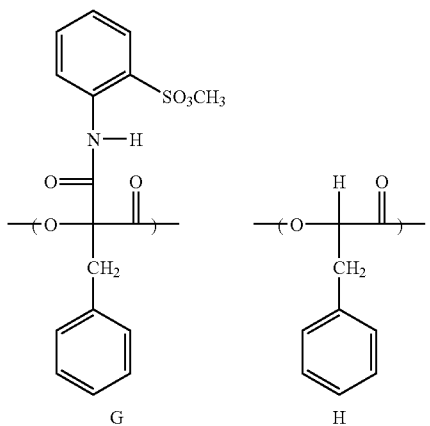

(265)

It was also confirmed that polyhydroxyalkanoate represented by the chemical formula (265) contained unit G by 11 mol %. Also an acid value titration utilizing a potentiometric titration apparatus AT510 (manufactured by Kyoto Electron Co.) did not show a peak attributable to a sulfonic acid, thus clarifying that the sulfonic acid was converted to methyl sulfonate. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=20,000 and a weight-averaged molecular weight Mw=30,400.

Example 53

A process was conducted in the same manner as in Example 52 except for employing polyhydroxyalkanoate obtained in Example 21 and represented by the chemical formula (235) instead of the polyhydroxyalkanoate represented by the chemical formula (234) in Example 20 and employing 0.77 ml of a 2 mol/L hexane solution of trimethylsilyl diazomethane (manufactured by Aldrich Inc.), to obtain 0.29 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (266) as monomer units, containing unit G by 11 mol %.

Also an acid value titration as in Example 52 did not show a peak derived from a sulfonic acid, thus clarifying that the sulfonic acid was converted to methyl sulfonate.

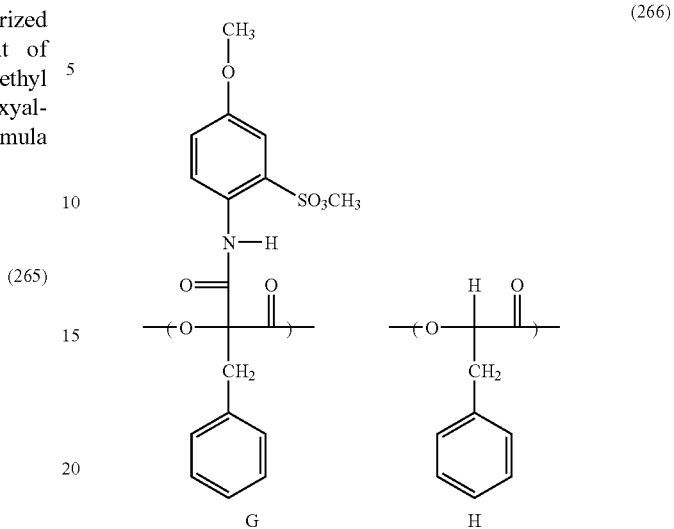

(266)

Also an average molecular weight of the obtained polyhydroxyalkanoate, measured under conditions same as in Example 52, was found as a number-averaged molecular weight Mn=18,900 and a weight-averaged molecular weight Mw=28,900.

Example 54

A process was conducted in the same manner as in Example 52 except for employing polyhydroxyalkanoate obtained in Example 24 and represented by the chemical formula (238) instead of the polyhydroxyalkanoate represented by the chemical formula (234) in Example 20 and employing 0.55 ml of a 2 mol/L hexane solution of trimethylsilyl diazomethane (manufactured by Aldrich Inc.), to obtain 0.29 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (267) as monomer units, containing unit G by 8 mol %.

Also an acid value titration as in Example 52 did not show a peak derived from a sulfonic acid, thus clarifying that the sulfonic acid was converted to methyl sulfonate.

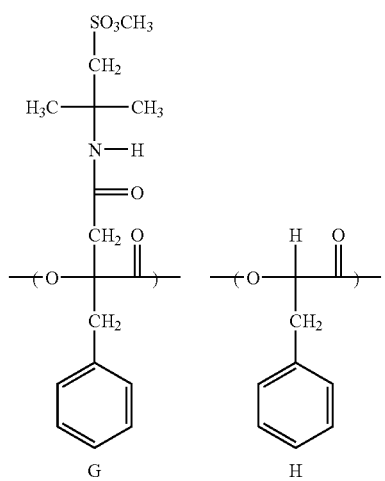

(267)

Also an average molecular weight of the obtained polyhydroxyalkanoate, measured under conditions same as in Example 52, was found as a number-averaged molecular weight Mn=19,100 and a weight-averaged molecular weight Mw=29,600.

Example 55

A process was conducted in the same manner as in Example 52 except for employing polyhydroxyalkanoate obtained in Example 29 and represented by the chemical formula (243) instead of the polyhydroxyalkanoate represented by the chemical formula (234) in Example 20 and employing 0.45 ml of a 2 mol/L hexane solution of trimethylsilyl diazomethane (manufactured by Aldrich Inc.), to obtain 0.29 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (268) as monomer units, containing unit G by 8 mol %.

Also an acid value titration as in Example 52 did not show a peak derived from a sulfonic acid, thus clarifying that the sulfonic acid was converted to methyl sulfonate.

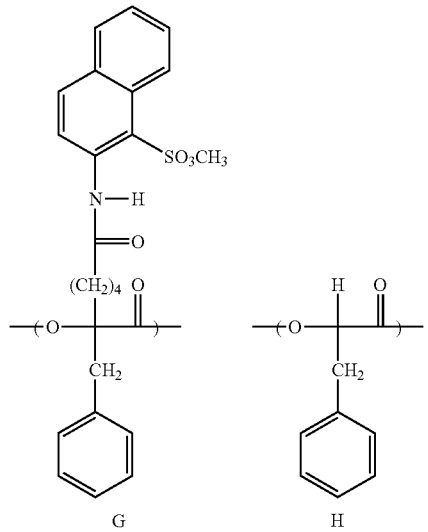

(268)

Also an average molecular weight of the obtained polyhydroxyalkanoate, measured under conditions same as in Example 52, was found as a number-averaged molecular weight Mn=16,800 and a weight-averaged molecular weight Mw=27,200.

Example 56

A process was conducted in the same manner as in Example 52 except for employing polyhydroxyalkanoate obtained in Example 30 and represented by the chemical formula (244) instead of the polyhydroxyalkanoate represented by the chemical formula (234) in Example 20 and employing 1.23 ml of a 2 mol/L hexane solution of trimethylsilyl diazomethane (manufactured by Aldrich Inc.), to obtain 0.29 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (269) as monomer units, containing unit G by 11 mol %.

Also an acid value titration as in Example 52 did not show a peak derived from a sulfonic acid, thus clarifying that the sulfonic acid was converted to methyl sulfonate.

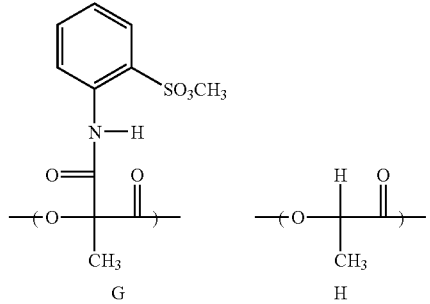

(269)

Also an average molecular weight of the obtained polyhydroxyalkanoate, measured under conditions same as in Example 52, was found as a number-averaged molecular weight Mn=26,000 and a weight-averaged molecular weight Mw=42,400.

Example 57

A process was conducted in the same manner as in Example 52 except for employing polyhydroxyalkanoate obtained in Example 31 and represented by the chemical formula (245) instead of the polyhydroxyalkanoate represented by the chemical formula (234) in Example 20 and employing 1.20 ml of a 2 mol/L hexane solution of trimethylsilyl diazomethane (manufactured by Aldrich Inc.), to obtain 0.29 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (270) as monomer units, containing unit G by 11 mol %.

Also an acid value titration as in Example 52 did not show a peak derived from a sulfonic acid, thus clarifying that the sulfonic acid was converted to methyl sulfonate.

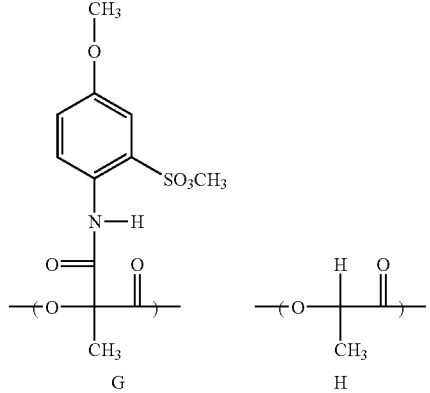

(270)

Also an average molecular weight of the obtained polyhydroxyalkanoate, measured under conditions same as in Example 52, was found as a number-averaged molecular weight Mn=25,500 and a weight-averaged molecular weight Mw=39,500.

Example 58

A process was conducted in the same manner as in Example 52 except for employing polyhydroxyalkanoate obtained in Example 32 and represented by the chemical formula (246) instead of the polyhydroxyalkanoate represented by the chemical formula (234) in Example 20 and employing 0.90 ml of a 2 mol/L hexane solution of trimethylsilyl diazomethane (manufactured by Aldrich Inc.), to obtain 0.30 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (271) as monomer units, containing unit G by 8 mol %.

Also an acid value titration as in Example 52 did not show a peak derived from a sulfonic acid, thus clarifying that the sulfonic acid was converted to methyl sulfonate.

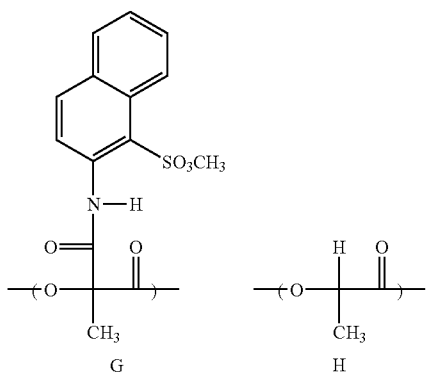

(271)

Also an average molecular weight of the obtained polyhydroxyalkanoate, measured under conditions same as in Example 52, was found as a number-averaged molecular weight Mn=27,000 and a weight-averaged molecular weight Mw=43,700.

Example 59

A process was conducted in the same manner as in Example 52 except for employing polyhydroxyalkanoate obtained in Example 33 and represented by the chemical formula (247) instead of the polyhydroxyalkanoate represented by the chemical formula (234) in Example 20 and employing 1.02 ml of a 2 mol/L hexane solution of trimethylsilyl diazomethane (manufactured by Aldrich Inc.), to obtain 0.30 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (272) as monomer units, containing unit G by 10 mol %.

Also an acid value titration as in Example 52 did not show a peak derived from a sulfonic acid, thus clarifying that the sulfonic acid was converted to methyl sulfonate.

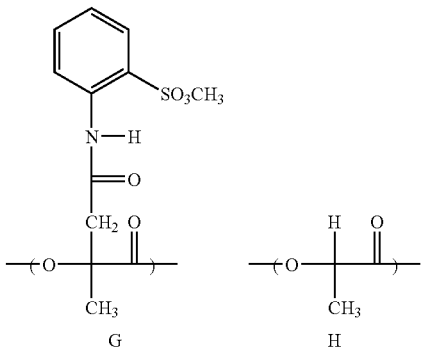

(272)

Also an average molecular weight of the obtained polyhydroxyalkanoate, measured under conditions same as in Example 52, was found as a number-averaged molecular weight Mn=23,900 and a weight-averaged molecular weight Mw=39,400.

Example 60

A process was conducted in the same manner as in Example 52 except for employing polyhydroxyalkanoate obtained in Example 39 and represented by the chemical formula (253) instead of the polyhydroxyalkanoate represented by the chemical formula (234) in Example 20 and employing 0.98 ml of a 2 mol/L hexane solution of trimethylsilyl diazomethane (manufactured by Aldrich Inc.), to obtain 0.29 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (273) as monomer units, containing unit G by 11 mol %.

Also an acid value titration as in Example 52 did not show a peak derived from a sulfonic acid, thus clarifying that the sulfonic acid was converted to methyl sulfonate.

(273)

Also an average molecular weight of the obtained polyhydroxyalkanoate, measured under conditions same as in Example 52, was found as a number-averaged molecular weight Mn=25,500 and a weight-averaged molecular weight Mw=40,800.

Example 61

A process was conducted in the same manner as in Example 52 except for employing polyhydroxyalkanoate obtained in Example 43 and represented by the chemical formula (256) instead of the polyhydroxyalkanoate represented by the chemical formula (234) in Example 20 and employing 1.08 ml of a 2 mol/L hexane solution of trimethylsilyl diazomethane (manufactured by Aldrich Inc.), to obtain 0.29 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (274) as monomer units, containing unit G by 12 mol %.

Also an acid value titration as in Example 52 did not show a peak derived from a sulfonic acid, thus clarifying that the sulfonic acid was converted to methyl sulfonate.

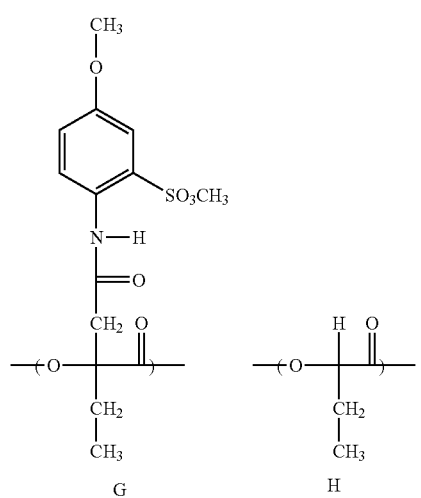

(274)

Also an average molecular weight of the obtained polyhydroxyalkanoate, measured under conditions same as in Example 52, was found as a number-averaged molecular weight Mn=18,900 and a weight-averaged molecular weight Mw=30,200.

Example 62

A process was conducted in the same manner as in Example 52 except for employing polyhydroxyalkanoate obtained in Example 46 and represented by the chemical formula (259) instead of the polyhydroxyalkanoate represented by the chemical formula (234) in Example 20 and employing 0.49 ml of a 2 mol/L hexane solution of trimethylsilyl diazomethane (manufactured by Aldrich Inc.), to obtain 0.30 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (275) as monomer units, containing unit G by 8 mol %.

Also an acid value titration as in Example 52 did not show a peak derived from a sulfonic acid, thus clarifying that the sulfonic acid was converted to methyl sulfonate.

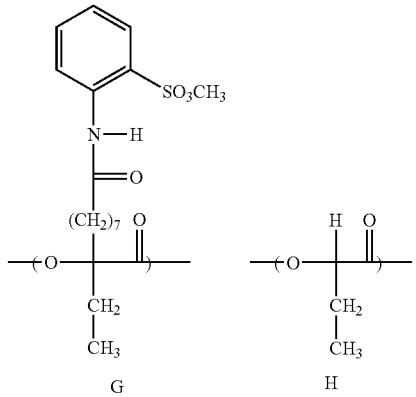

(275)

Also an average molecular weight of the obtained polyhydroxyalkanoate, measured under conditions same as in Example 52, was found as a number-averaged molecular weight Mn=20,000 and a weight-averaged molecular weight Mw=33,000.

Example 63

A process was conducted in the same manner as in Example 52 except for employing polyhydroxyalkanoate obtained in Example 48 and represented by the chemical formula (261) instead of the polyhydroxyalkanoate represented by the chemical formula (234) in Example 20 and employing 0.70 ml of a 2 mol/L hexane solution of trimethylsilyl diazomethane (manufactured by Aldrich Inc.), to obtain 0.29 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (276) as monomer units, containing unit G by 11 mol %.

Also an acid value titration as in Example 52 did not show a peak derived from a sulfonic acid, thus clarifying that the sulfonic acid was converted to methyl sulfonate.

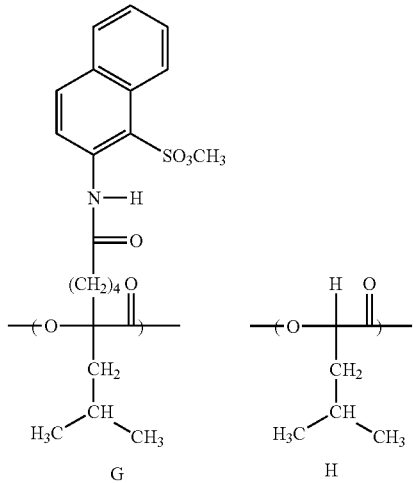

(276)

Also an average molecular weight of the obtained polyhydroxyalkanoate, measured under conditions same as in Example 52, was found as a number-averaged molecular weight Mn=19,500 and a weight-averaged molecular weight Mw=33,200.

Example 64

A process was conducted in the same manner as in Example 52 except for employing polyhydroxyalkanoate obtained in Example 50 and represented by the chemical formula (263) instead of the polyhydroxyalkanoate represented by the chemical formula (234) in Example 20 and employing 0.60 ml of a 2 mol/L hexane solution of trimethylsilyl diazomethane (manufactured by Aldrich Inc.), to obtain 0.29 g of a polymer. In an NMR analysis and a Fourier transformed infrared absorption (FT-IR) spectrum under conditions same as in Example 52, the obtained polymer was confirmed as a polyhydroxyalkanoate containing units represented by a chemical formula (277) as monomer units, containing unit G by 8 mol %.

Also an acid value titration as in Example 52 did not show a peak derived from a sulfonic acid, thus clarifying that the sulfonic acid was converted to methyl sulfonate.

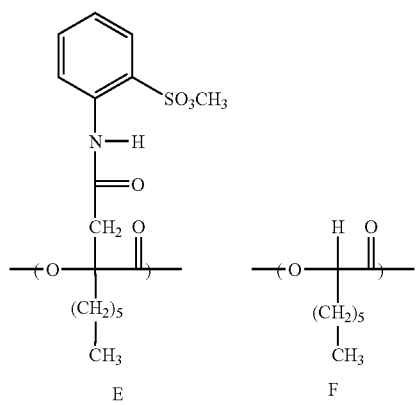

(277)

Also an average molecular weight of the obtained polyhydroxyalkanoate, measured under conditions same as in Example 52, was found as a number-averaged molecular weight Mn=18,600 and a weight-averaged molecular weight Mw=31,200.

Example 65

2.00 g of polyhydroxyalkanoate obtained in Example 1 and constituted of a unit represented by the chemical formula (201) were placed in an eggplant-shaped flask, and dissolved by adding 100 ml of THF. The solution was placed under a nitrogen atmosphere and agitated at −78° C. Then 18.9 ml of a 2M THF solution of lithium diisopropylamide were slowly added and the mixture was agitated for 30 minutes at −78° C. Then 5.91 g of methyl 2-acrylamide-2-methylpropane sulfonate were added and the mixture was agitated for 30 minutes at the room temperature. After the reaction, the reaction mixture was poured into 400 ml of an aqueous solution of ammonium chloride, then 200 ml of dichloromethane were added and the organic layer was separated. The organic layer was recovered after washing three times with 100 ml of water, and the solvent was distilled off to recover a crude polymer. It was then dissolved in 12 ml of THF, and was re-precipitated in methanol of a 50-times amount of that of THF required for dissolving. The precipitate was recovered and dried under a reduced pressure to obtain 1.22 g of polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature). As a result, there was confirmed a polyhydroxyalkanoate containing units represented by a chemical formula (278) as monomer units. It was also confirmed that a proportion of the monomer units was unit E by 7 mol % and unit F by 93 mol %.

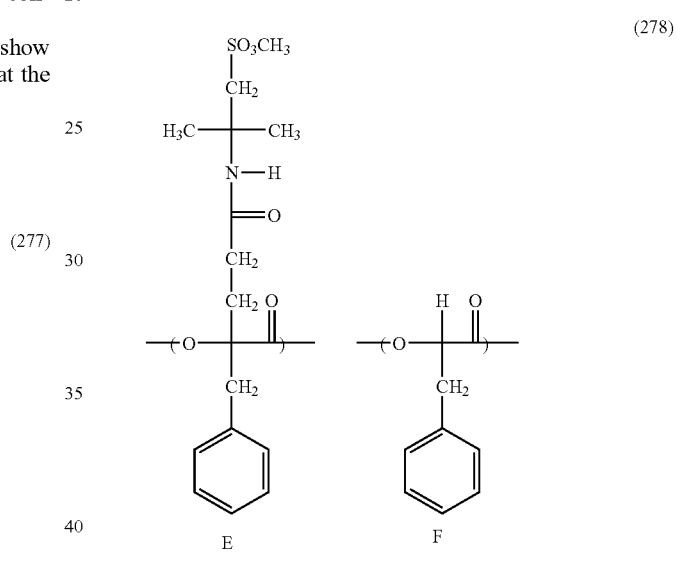

(278)

An average molecular weight of the obtained polyhydroxyalkanoate was evaluated by gel permeation chromatography (GPC: Tosoh HLC-8120, column: Polymer Laboratories PLgel 5 MIXED-C, solvent: DMF/LiBr 0.1% (w/v), converted as polystyrene). As a result, there were obtained a number-averaged molecular weight Mn=25,500 and a weight-averaged molecular weight Mw=38,200.

Example 66

2.00 g of polyhydroxyalkanoate obtained in Example 2 and constituted of a unit represented by the chemical formula (202) were placed in an eggplant-shaped flask, and dissolved by adding 100 ml of THF. The solution was placed under a nitrogen atmosphere and agitated at −78° C. for 30 min. Then 18.9 ml of a 2M THF solution of lithium diisopropylamide were slowly added and the mixture was agitated for 30 minutes at −78° C. Then 12.17 g of methyl 2-acrylamide-2-methylpropane sulfonate were added and the mixture was agitated for 30 minutes at the room temperature. After the reaction, the reaction mixture was poured into 400 ml of an aqueous solution of ammonium chloride, then 200 ml of dichloromethane were added and the organic layer was separated. The organic layer was recovered after washing three times with 100 ml of water, and the solvent was distilled off to recover a crude polymer. It was then dissolved in 12 ml of THF, and was re-precipitated in methanol of a 50-times amount of that of THF required for dissolving. The precipitate was recovered and dried under a reduced pressure to obtain 1.22 g of polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature). As a result, there was confirmed a polyhydroxyalkanoate containing units represented by a chemical formula (279) as monomer units. It was also confirmed that a proportion of the monomer units was unit E by 8 mol % and unit F by 92 mol %.

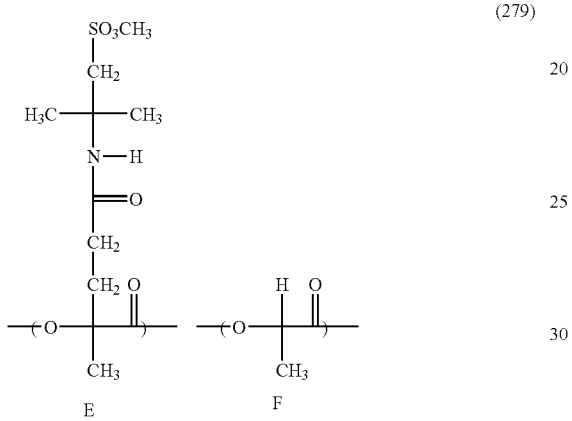

(279)

An average molecular weight of the obtained polyhydroxyalkanoate was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=30,000 and a weight-averaged molecular weight Mw=44,900.

INDUSTRIAL APPLICABILITY

The present invention provides a novel polyhydroxyalkanoate containing, in a side chain, a carboxyl group as a reactive group in the molecule, a novel polyhydroxyalkanoate containing a unit having an amide group and a sulfonic acid group in the molecule, and a producing method therefor. The novel polyhydroxyalkanoate having a carboxyl group is capable of introducing a functional group utilizing such reactive group and is therefore applicable to a functional material. Also the polyhydroxyalkanoate containing a carboxyl group or a unit having an amide group and a sulfonic acid group has an excellent melt working property and an adaptability to organisms, is thus anticipated for soft members for medical use.

This application claims priorities from Japanese Patent Applications No. 2004-174788 filed Jun. 11, 2004 and No. 2005-168914 filed Jun. 8, 2005, which are hereby incorporated by reference herein.

The invention claimed is:

1. A polyhydroxyalkanoate comprising at least a unit represented by a chemical formula (1) within a molecule:

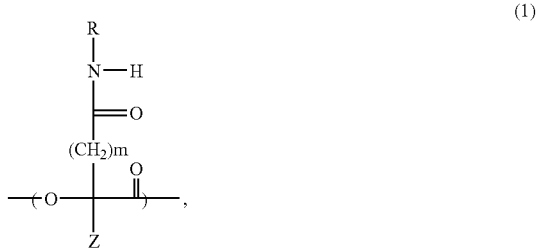

(1)

wherein R represents $-A_1-SO_2R_1$; $R_1$ represents OH, a halogen atom, ONa, OK or $OR_{1a}$; $R_{1a}$ and $A_1$ each independently represents a group having a substituted or unsubstituted aliphatic hydrocarbon structure, a substituted or unsubstituted aromatic ring structure or a substituted or unsubstituted heterocyclic structure; m represents an integer selected from 1-8; Z represents a linear or branched alkyl group, an aryl group or an aralkyl group substituted with an aryl group; and in case plural units are present, R, $R_1$, $R_{1a}$, $A_1$, m and Z are selected independently for each unit.

2. The polyhydroxyalkanoate according to claim 1, comprising, as the unit represented by the chemical formula (1), at least a unit represented by a chemical formula (2), a chemical formula (3), a chemical formula (4A) or (4B), within a molecue:

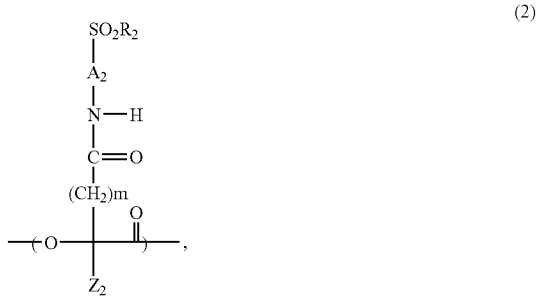

(2)

wherein $R_2$ represents OH, a halogen atom, ONa, OK or $OR_{2a}$; $R_{2a}$ represents a linear or branched alkyl group with 1 to 8 carbon atoms or a substituted or unsubstituted phenyl group; $A_2$ represents a linear or branched alkylene group with 1 to 8 carbon atoms; m represents an integer selected from 1-8; $Z_2$ represents a linear or branched alkyl group, an aryl group or an aralkyl group substituted with an aryl group; and in case plural units are present, $A_2$, $R_2$, $R_{2a}$, m and $Z_2$ are selected independently for each unit;

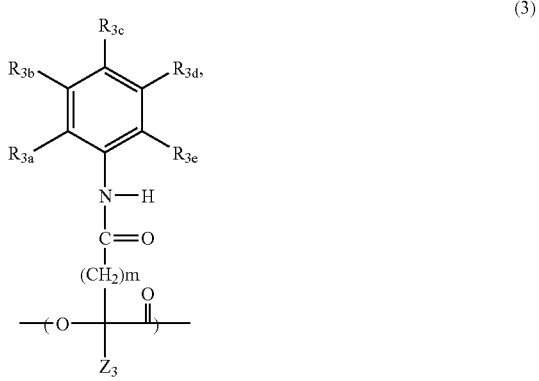

(3)

wherein:

each of $R_{3a}$, $R_{3b}$, $R_{3c}$, $R_{3d}$ and $R_{3e}$ independently represents $SO_2R_{3f}$, a hydrogen atom, a halogen atom, an alkyl group with 1-20 carbon atoms, an alkoxy group with 1-20 carbon atoms, an OH group, an $NH_2$ group, an $NO_2$ group, $COOR_{3g}$, an acetamide group, an OPh group, an NHPh group, a $CF_3$ group, a $C_2F_5$ group or a $C_3F_7$ group, of which at least one is $SO_2R_{3f}$;

m represents an integer selected from 1-8; $Z_3$ represents a linear or branched alkyl group, an aryl group or an aralkyl group substituted with an aryl group; and in case plural units are present, $R_{3a}$, $R_{3b}$, $R_{3c}$, $R_{3d}$, $R_{3e}$, $R_{3f}$, $R_{3f1}$, $R_{3g}$, m and $Z_3$ are selected independently for each unit, where $R_{3f}$ is OH, a halogen atom, ONa, OK or $OR_{3f1}$;

$R_{3f1}$ is a linear or branched alkyl group with 1 to 8 carbon atoms or a substituted or unsubstituted phenyl group;

$R_{3g}$ is H, Na or K; and

Ph is a phenyl group;

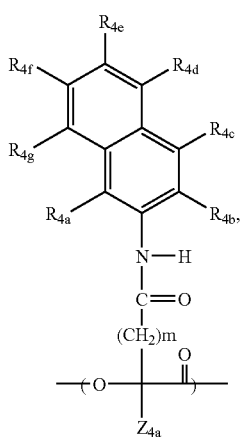

(4A)

wherein:

each of $R_{4a}$, $R_{4b}$, $R_{4c}$, $R_{4d}$, $R_{4e}$, $R_{4f}$ and $R_{4g}$ independently represents $SO_2R_{4o}$, a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$, an acetamide group, an OPh group, an NHPh group, a $CF_3$ group, a $C_2F_5$ group or a $C_3F_7$ group, of which at least one is $SO_2R_{4o}$;

m represents an integer selected from 1-8;

$Z_{4a}$ represents a linear or branched alkyl group, an aryl group or an aralkyl group substituted with an aryl group; and in case plural units are present, $R_{4a}$, $R_{4b}$, $R_{4c}$, $R_{4d}$, $R_{4e}$, $R_{4f}$, $R_{4g}$, $R_{4o}$, $R_{4o1}$, $R_{4p}$, m and $Z_{4a}$ are selected independently for each unit, where $R_{4o}$ is OH, a halogen atom, ONa, OK or $OR_{4o1}$;

$R_{4o1}$ is a linear or branched alkyl group with 1 to 8 carbon atoms or a substituted or unsubstituted phenyl group;

$R_{4p}$ is H, Na or K; and

Ph is a phenyl group;

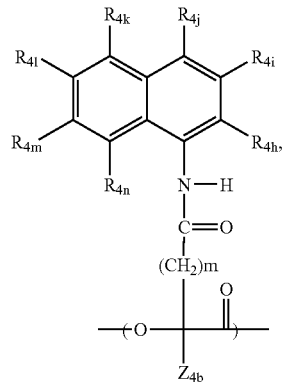

(4B)

wherein:

each of $R_{4h}$, $R_{4i}$, $R_{4j}$, $R_{4k}$, $R_{4l}$, $R_{4m}$ and $R_{4n}$ independently represents $SO_2R_{4o}$, a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$, an acetamide group, an OPh group, an NHPh group, a $CF_3$ group, a $C_2F_5$ group or a $C_3F_7$ group, of which at least one is $SO_2R_{4o}$;

m represents an integer selected from 1-8;

$Z_{4b}$ represents a linear or branched alkyl group, an aryl group or an aralkyl group substituted with an aryl group; and in case plural units are present, $R_{4h}$, $R_{4i}$, $R_{4j}$, $R_{4k}$, $R_{4l}$, $R_{4m}$, $R_{4n}$, $R_{4o}$, $R_{4o1}$, $R_{4p}$, m and $Z_{4b}$ are selected independently for each unit, where $R_{4o}$ is OH, a halogen atom, ONa, OK or $OR_{4o1}$;

$R_{4o1}$ is a linear or branched alkyl group with 1 to 8 carbon atoms or a substituted or unsubstituted phenyl group; and $R_{4p}$ is H, Na or a K;

Ph is a phenyl group.

3. The polyhydroxyalkanoate according to claim 1, further comprising a unit represented by a chemical formula (6) within a molecule:

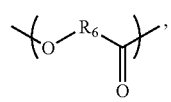

(6)

wherein $R_6$ represents a linear or branched alkylene with 1-11 carbon atoms an alkyleneoxyalkylene group, each alkylene group being, independently, with 1-2 carbon atoms, or a linear or branched alkenyl group with 1-11 carbon atoms, which may be substituted with an aryl group; and in case plural units are present, $R_6$ is selected independently for each unit.

4. The polyhydroxyalkanoate according to claim 2, further comprising a unit represented by a chemical formula (6) within a molecule:

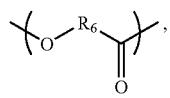 (6)

wherein $R_6$ represents a linear or branched alkylene with 1-11 carbon atoms an alkyleneoxyalkylene group, each alkylene group being, independently, with 1-2 carbon atoms, or a linear or branched alkenyl group with 1-11 carbon atoms, which may be substituted with an aryl group; and in case plural units are present, $R_6$ is selected independently for each unit.